(12) United States Patent
Yuan

(10) Patent No.: US 11,403,104 B2
(45) Date of Patent: Aug. 2, 2022

(54) NEURAL NETWORK PROCESSOR, CHIP AND ELECTRONIC DEVICE

(71) Applicant: GUANGDONG OPPO MOBILE TELECOMMUNICATIONS CORP., LTD., Guangdong (CN)

(72) Inventor: Shengguang Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/113,016

(22) Filed: Dec. 5, 2020

(65) Prior Publication Data

US 2021/0173659 A1 Jun. 10, 2021

(30) Foreign Application Priority Data

Dec. 9, 2019 (CN) .......................... 201911253027.0

(51) Int. Cl.
*G06F 9/30* (2018.01)
*G06F 9/38* (2018.01)
*G06F 13/16* (2006.01)
*G06F 15/78* (2006.01)
(Continued)

(52) U.S. Cl.
CPC ........ *G06F 9/3838* (2013.01); *G06F 9/30036* (2013.01); *G06F 13/1668* (2013.01); *G06F 15/78* (2013.01); *G06N 3/063* (2013.01); *G06N 3/08* (2013.01)

(58) Field of Classification Search
CPC ............... G06F 9/3838; G06F 9/30036; G06F 13/1668; G06F 15/78; G06N 3/063
See application file for complete search history.

(56) References Cited

U.S. PATENT DOCUMENTS

| 5,815,608 A * | 9/1998 | Lange ...................... G06K 9/78 |
| | | 382/312 |
| 10,783,438 B2 * | 9/2020 | Kim ........................ G06N 3/084 |
| 10,929,746 B2 * | 2/2021 | Litvak ................... G06N 3/0454 |

(Continued)

FOREIGN PATENT DOCUMENTS

| CN | 109359736 | 2/2019 |
| CN | 110147251 | 8/2019 |

(Continued)

OTHER PUBLICATIONS

WIPO, International Search Report for PCT Application No. PCT/CN2020/133143, dated Feb. 25, 2021.

(Continued)

*Primary Examiner* — Cheng Yuan Tseng
(74) *Attorney, Agent, or Firm* — Hodgson Russ LLP

(57) ABSTRACT

The embodiments of the disclosure provide a neural network processor, a chip and an electronic device. The neural network processor includes a convolution processing unit, a vector processing unit, and an instruction issue module. The convolution processing unit and the vector processing unit are both connected to the instruction issue module. The instruction issue module is configured to issue a plurality of instructions to the convolution processing unit and the vector processing unit in parallel. The embodiments of the application can improve the efficiency of the neural network processor processing data.

16 Claims, 15 Drawing Sheets

(51) Int. Cl.
   *G06N 3/063* (2006.01)
   *G06N 3/08* (2006.01)

(56) References Cited

U.S. PATENT DOCUMENTS

| | | | |
|---|---|---|---|
| 10,990,810 B2* | 4/2021 | Liu | G06N 5/003 |
| 10,997,273 B2* | 5/2021 | Pratas | G06F 12/0862 |
| 11,080,595 B2* | 8/2021 | Bradbury | G06N 3/08 |
| 11,128,864 B2* | 9/2021 | Galpin | G06T 9/002 |
| 2017/0140260 A1* | 5/2017 | Manning | G06N 3/02 |
| 2017/0316312 A1* | 11/2017 | Goyal | G06N 3/0454 |
| 2017/0344880 A1* | 11/2017 | Nekuii | G06F 17/153 |
| 2018/0307976 A1 | 10/2018 | Fang et al. | |
| 2019/0018019 A1* | 1/2019 | Shan | G16B 40/00 |
| 2019/0026600 A1* | 1/2019 | Bagherinezhad | G06K 9/6262 |
| 2019/0139182 A1 | 5/2019 | Nurvitadhi et al. | |
| 2019/0183429 A1* | 6/2019 | Sung | G06K 9/42 |
| 2019/0297326 A1* | 9/2019 | Reda | G06T 5/20 |
| 2019/0340486 A1* | 11/2019 | Mills | G06F 7/5443 |
| 2020/0089977 A1* | 3/2020 | Lakshmi Narayanan | G06K 9/00791 |
| 2020/0243102 A1* | 7/2020 | Schmidt | G06N 3/063 |
| 2020/0267182 A1* | 8/2020 | Highnam | G06N 3/0454 |
| 2020/0279369 A1* | 9/2020 | Kadir | G06T 7/0012 |
| 2020/0293867 A1* | 9/2020 | Shao | G06F 17/16 |
| 2020/0356837 A1* | 11/2020 | Hargil | G06N 3/0454 |
| 2020/0372609 A1* | 11/2020 | Li | G06T 3/4046 |
| 2020/0409528 A1* | 12/2020 | Lee | G06N 3/02 |
| 2021/0012177 A1* | 1/2021 | Yang | G06K 9/6273 |
| 2021/0089316 A1* | 3/2021 | Rash | G06N 3/04 |
| 2021/0104086 A1* | 4/2021 | Wang | G06N 3/084 |
| 2021/0201078 A1* | 7/2021 | Yao | G06K 9/6257 |
| 2021/0271847 A1* | 9/2021 | Courtiol | G06K 9/6261 |
| 2021/0334657 A1* | 10/2021 | Jordan | G06N 3/002 |

FOREIGN PATENT DOCUMENTS

| | | | |
|---|---|---|---|
| CN | 110163333 | 8/2019 | |
| EP | 3540654 | 9/2019 | |
| WO | 2018184192 | 10/2018 | |
| WO | WO-2019053835 A1 * | 3/2019 | G06N 3/063 |

OTHER PUBLICATIONS

EPO, Extended European Search Report for EP Application No. 20210416.2, dated Sep. 3, 2021.

IPI, Office Action for IN Application No. 202014052353, dated Jan. 6, 2022.

* cited by examiner

NEURAL NETWORK PROCESSOR, CHIP AND ELECTRONIC DEVICE

CROSS-REFERENCE TO RELATED APPLICATION

This application claims priority to Chinese Patent Application No. 201911253027.0, filed Dec. 9, 2019, the entire disclosure of which is incorporated herein by reference.

TECHNICAL FIELD

The present disclosure relates to the field of electronic technologies, and more particularly, to a neural network processor, a chip, and an electronic device.

BACKGROUND

Artificial neural network can abstract a neural network from the perspective of information processing, establish a certain simple model, and form different networks according to different connection manners. These research techniques are usually called as deep learning, computer learning and similar terms.

In related technologies, neural network processors work with single-issue instructions, such as matrix multiplication, convolution, and pooling.

SUMMARY

The disclosure provides a neural network processor, a chip and an electronic device.

Embodiments of the disclosure provides a neural network processor, which comprises a convolution processing unit, a vector processing unit, and an instruction issue module. The convolution processing unit and the vector processing unit are both connected to the instruction issue module. The instruction issue module is configured to issue a plurality of instructions to the convolution processing unit and the vector processing unit in parallel.

Embodiments of the disclosure provides a chip. The chip includes a system bus, an external memory, and a central processing unit. The neural network processor is connected to both of the external memory and the central processing unit via the system bus, the neural network processor is controlled by the central processing unit to acquire data to-be-processed from the external memory, process the data to-be-processed to form a processing result, and feed back the processing result to the external memory. The neural network processor includes a convolution processing unit, a vector processing unit and an instruction issue module. The instruction issue module is in communication with the instruction issue module and configured to issue a plurality of instructions to the convolution processing unit and the vector processing unit in parallel.

Embodiments of the disclosure provides an electronic device. The electronic device includes a system bus, an external memory, and a central processing unit. The neural network processor is connected to both of the external memory and the central processing unit via the system bus, the neural network processor is controlled by the central processing unit to acquire data to-be-processed from the external memory, process the data to-be-processed to form a processing result, and feed back the processing result to the external memory. The neural network processor includes a convolution processing unit, a vector processing unit and an instruction issue module. The instruction issue module is in communication with the instruction issue module and configured to issue a plurality of instructions to the convolution processing unit and the vector processing unit in parallel.

In the embodiments of the disclosure, the instruction issue module of the neural network processor can issue multiple instructions in parallel to different processing units, and different processing units such as the convolution processing unit and the vector processing unit can process, according to the instructions, the data they received, thereby improving the efficiency of data processing.

BRIEF DESCRIPTION OF THE DRAWINGS

In order to more clearly describe the technical solutions in the embodiments of the disclosure, the following briefly introduces the drawings needed to be used in the description of the embodiments.

DETAILED DESCRIPTION OF PREFERRED EMBODIMENTS

The technical solutions provided by the embodiments of the disclosure can be applied to various scenarios that require image processing on input images to obtain corresponding output images, and these scenarios are not limited in the embodiments of the disclosure. For instance, the technical solutions provided by the embodiments of the disclosure can be applied to various scenarios in the fields of computer vision, such as face recognition, image classification, target detection, and semantic segmentation.

Figure 1:
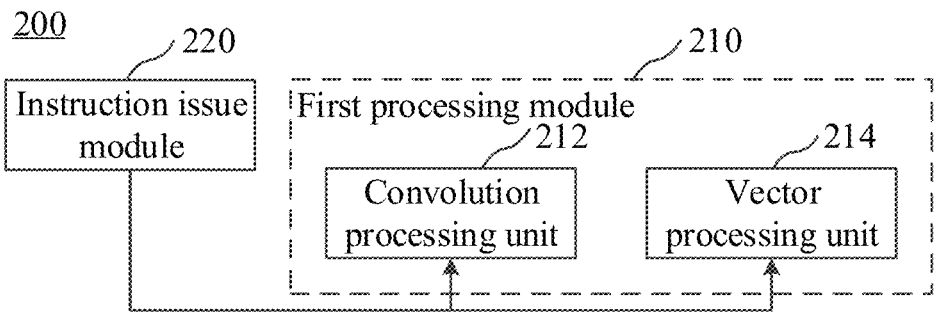
FIG. 1 is a schematic diagram showing a first structure of a neural network processor according to an embodiment of the disclosure.

FIG. 1 illustrates a first structure of a neural network processor according to an embodiment of the application. A neural network processor (NNP, also referred to as neural network process unit, NPU) 200 may include a first processing module 210 and an instruction issue module 220.

The first processing module 210 may include one or more processing units, such as a convolution processing unit 212 and a vector processing unit 214. The one or more processing units included in the first processing module 210 each may be able to process vectors. It should be noted that the embodiments of the application do not limit the type of data processed by the first processing module 210.

The convolution processing unit 212 may also be referred to as a convolution operation unit or a convolution calculation engine. The convolution processing unit 212 may include a number of multiply accumulate (MAC) units. The number of the MAC units may be several thousand. For instance, the convolution processing unit 212 may include 4096 MAC units which can be classified into 16 cells, and each cell can calculate dot products whose maximum number of elements is 256.

The vector processing unit 214 may also be referred to as a vector calculation unit or a single instruction multiple data (SIMD) processing unit. The vector processing unit 214 is an bit-wise vector calculation engine that can process regular arithmetic operations such as addition, subtraction, multiplication, and division between vectors, and can also process bit-wise logical operations such as AND, OR, NOT, XOR and the like. It should be noted that the vector processing unit 214 of the embodiments of the application may also support common activation functions such as rectified linear unit (ReLU), PRelu, and the like. It should also be noted that the vector processing unit 214 of the embodiments of the application may also support non-linear activation functions, such as Sigmoid and Tanh, through looking up tables.

The instruction issue module 220 may also be referred to as an instruction pre-processing module. The instruction issue module 220 is connected to every processing unit included in the first processing module 210. For instance, the instruction issue module 220 is connected with both of the convolution processing unit 212 and the vector processing unit 214. The instruction issue module 220 can issue instructions to the first processing module 210, that is, the instruction issue module 220 can issue instructions to the one or more processing units of the first processing module 210.

In some embodiments, the instruction issue module 220 can issue multiple instructions to the first processing module 210 in parallel. For instance, the instruction issue module 220 may issue multiple instructions to each of the convolution processing unit 212 and the vector processing unit 214 in parallel. For instance, the instruction issue module 220 can issue multiple instructions, in a clock cycle, to the convolution processing unit 212 and the vector processing unit 214 in parallel. Thus, the embodiments of the application support multi-issue instruction operations and can execute multiple instructions simultaneously. For example, the convolution processing unit 212 and the vector processing unit 214 can execute convolution calculating instructions and vector calculating instructions, respectively. After the convolution processing unit 212 and the vector processing unit 214 receive their respective instructions, the convolution processing unit 212 and the vector processing unit 214 process their respective received data according to their respective instructions to obtain processing results. Thus, the embodiments of the application can improve the calculation efficiency, in other words, the application can improve the efficiency of the NPU in processing data.

It can be understood that the processing units, corresponding to the multiple instructions issued by the instruction issue module 220, have no resource conflicts during the execution.

The multiple instructions issued by the instruction issue module 220 may include one or more fine-grain instructions. The instruction issue module 220 can issue the one or more fine-grain instructions to the convolution processing unit 212. After receiving the one or more fine-grain instructions, the convolution processing unit 212 can perform, according to the received one or more fine-grain instructions, an operation of dot product on its' received data.

It should be understood that the instruction issue module 220 is not limited to issue the fine-grained instructions to the convolution processing unit 212. The instruction issue module 220 may also issue at least one of the fine-grained instructions to the vector processing unit 214 or any other processing units included in the first processing module 210.

The instructions that can be issued by the instruction issue module 220 in the embodiments of the application are not limited to the fine-grain instructions. The embodiments of the application do not limit the instructions that can be issued by the instruction issue module 220. It should be noted that, the instructions that can be issued may include different types of instructions, such as calculation-type instructions, control-type instructions, etc., where the math-type instructions may include a first calculation instruction, a second calculation instruction, and a third calculation instruction.

The operation corresponding to the fine-grained instruction accurately corresponds to each clock cycle, it is different from a coarse-grained processor, that is, it is different that, one coarse-grained instruction requires more than one clock cycles to be executed and completed by the processor. It can also be understood that fine-grained instructions are reflected in the granularity of the processing unit is relatively fine. For instance, the convolution processing unit 212 can complete a basic dot product operation based on one fine-grained instruction, while the coarse-grained processor can complete a matrix multiplication operation based on one coarse-grained instruction. It can be understood that the matrix multiplication operation consists of a number of dot product operations. It can be seen that the embodiments of the application can support multi-issue fine-grained instruction operations, can improve the flexibility of programming, and has better versatility.

The instruction issue module 220 may issue the first calculation instruction and the second calculation instruction in parallel to the convolution processing unit 212 and the vector processing unit 214, respectively. For instance, the instruction issue module 220 issues the first calculation instruction to the convolution processing unit 212 and issues the second calculation instruction to the vector processing unit 214, within one clock cycle. The convolution processing unit 212 can perform, according to the first calculation instruction issued by the instruction issue module 220, a dot product operation on its' received data. The vector processing unit 214 may perform, according to the second calculation instruction issued by the instruction issue module 220, a vector computing operation on its' received data.

It should be noted that the processing units included in the first processing module 210 are not limited to the convolution processing unit 212 and the vector processing unit 214, the first processing module 210 may also include one or more other processing units such as a shaping processing unit.

Figure 2:
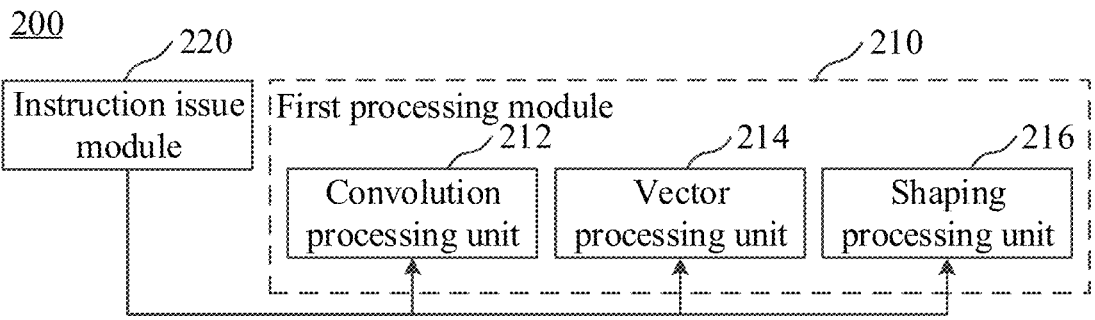
FIG. 2 is a schematic diagram showing a second structure of a neural network processor according to an embodiment of the disclosure.

FIG. 2 illustrates a second structure of a neural network processor according to an embodiment of the application. A first processing module 210 of a neural network processor 200, provided by the embodiment of the application, may include a convolution processing unit 212, a vector processing unit 214, and a shaping processing unit 216. The convolution processing unit 212 and the vector processing unit 214 of this embodiment may refer to the convolution processing unit 212 and the vector processing unit 214 shown in FIG. 1, and will not be repeated here. The shaping processing unit 216 can also referred to as a shaping engine.

The shaping processing unit 216 is connected to an instruction issue module 220. The instruction issue module 220 may issue a number of instructions to the convolution processing unit 212, the vector processing unit 214, and the shaping processing unit 216. For instance, the instruction issue module 220 can issue a number of instructions to the convolution processing unit 212, the vector processing unit 214, and the shaping processing unit 216, within one clock cycle. The shaping processing unit 216 may perform, according to one or more particular instructions such as a third calculation instruction issued by the instruction issue module 220, data processing on its' received data. The shaping processing unit 216 can support common Reshape operations in Tensor, such as dimension transposition, segmentation according to a dimension, padding, etc.

It should be noted that the instruction issue module 220 is not limited to issue instructions to the first processing module 210. In other embodiments, the instruction issue module 220 may also issue one or more instructions to one or more other processing modules.

Figure 3:
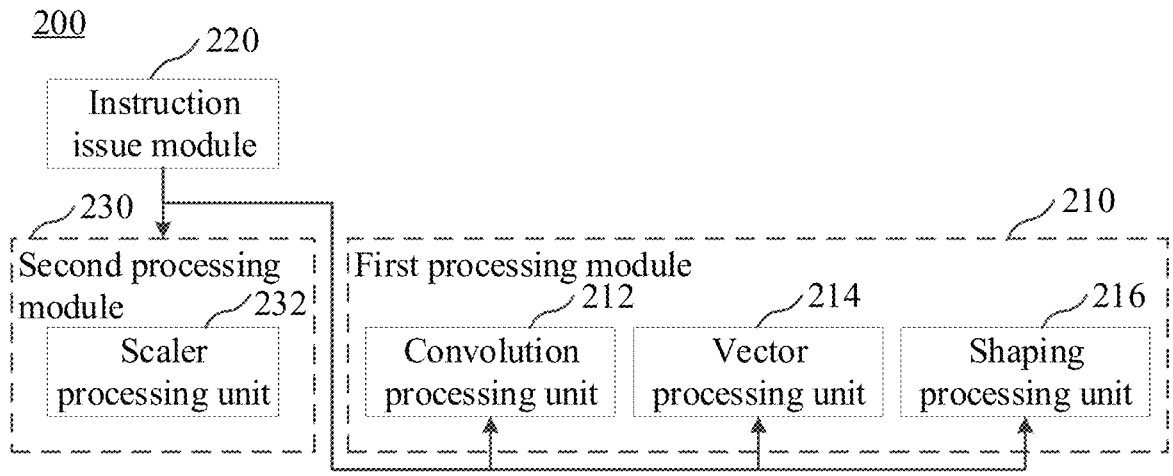
FIG. 3 is a schematic diagram showing a third structure of a neural network processor according to an embodiment of the disclosure.

FIG. 3 illustrates a third structure of a neural network processor according to an embodiment of the application. A neural network processor 200 provided by this embodiment may include a first processing module 210, a second processing module 230, and an instruction issue module 220. The first processing unit at least includes a convolution processing unit 212, it can also include one or more other processing units such as a vector processing unit 214 and a shaping processing unit 216. The convolution processing unit 212 is configured to perform dot product operations on the data it receives, details can refer to the above content and are not repeated here again. The vector processing unit 214 can refer to the above content and details are not repeated here. The shaping processing unit 216 also can refer to the above content and details are not described herein again.

The second processing module 230 is configured to process scalar data, and it at least includes a scalar processing unit (SPU) 232. The scalar processing unit 232 may be a processing unit compatible with RISC-V instruction set. The scalar processing unit 232 may include a scalar register file (SRF), that is, the scalar processing unit 232 may include a number of scalar registers.

The instruction issue module 220 is in communication with both of the first processing module 210 and the second processing module 230, and the instruction issue module 220 can issue multiple instructions to each of the first processing module 210 and the second processing module 230 in parallel. For instance, the instruction issue module 220 issues multiple instructions to the convolution processing unit 212 and the scalar processing unit 232 in parallel within one clock cycle.

It should be understood that, if the first processing module 210 further includes one or more other processing units, the instruction issue module 220 may also issue more than one instructions to the one or more other processing units in parallel within one clock cycle. For example, the instruction issue module 220 issues a number of instructions in parallel to the convolution processing unit 212, the vector processing unit 214, and the scalar processing unit 232 in one clock cycle. For another example, the instruction issue module 220 issues a number of instructions in parallel to the convolution processing unit 212, the shaping processing unit 216, and the scalar processing unit 232, in one clock cycle. For still another example, the instruction issue module 220 issues a number of instructions, in one clock cycle, to the convolution processing unit 212, the vector processing unit 214, the shaping processing unit 216, and the scalar processing unit 232 in parallel.

It should also be understood that in practical processes, the instruction issue module 220 is not limited to this. The instruction issue module 220 can issue, according to requirements of neural network processor 200 to process data, different instructions in parallel to more than one processing units included in the same processing module, or different instructions in parallel to more than one processing units in different processing modules. The above are just a few examples of how the instruction issue module 220 issues multiple instructions in parallel in the technical solution provided by the embodiment. The manner in which the instruction issue module 220 of the technical solution provided in the embodiment issues instructions is not limited to this. For example, the instruction issue module 220 issues multiple instructions to the scalar processing unit 232 and the vector processing unit 214 in parallel. For another example, the instruction issue module 220 issues multiple instructions to the shaping processing unit 216 and the vector processing unit 214 in parallel.

The scalar processing unit 232 processes its' received data according to one or more instructions issued by the instruction issue module 220, such as one or more control instructions. The scalar processing unit 232 may receive one or more scalar instructions, such as one or more control instructions. The scalar processing unit 232 is mainly responsible for scalar operations in the neural network processor 200.

It should be noted that the scalar processing unit 232 can not only receive instructions from the instruction issue module 220, but also transmit a new program counter (PC) value to the instruction issue module 220.

Figure 4:
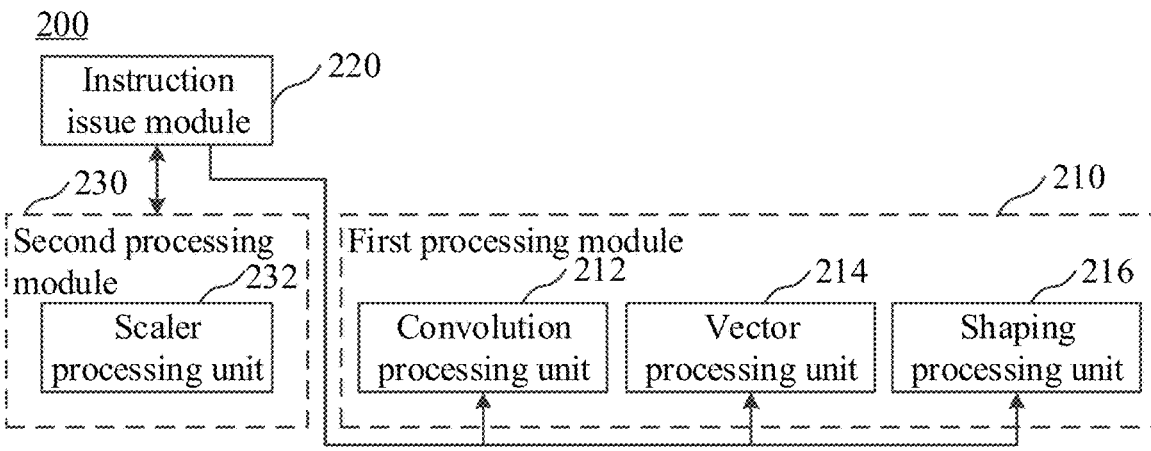
FIG. 4 is a schematic diagram showing a fourth structure of a neural network processor according to an embodiment of the disclosure.

FIG. 4 illustrates a fourth structure of a neural network processor according to an embodiment of the application. A scalar processing unit 232 can not only receive instructions from an instruction issue module 220, but also transmit a new PC value to the instruction issue module 220. The scalar processing unit 232 can execute scalar computing instructions (e.g., arithmetic operations such as addition, subtraction, multiplication, and division, and logical operations), branch instructions (e.g., conditional judgment operations), and jump instructions (e.g., function call operations). When processing branch instructions and jump instructions, the scalar processing unit 232 returns the new PC value to the instruction issue module 220, so that the instruction issue module 220 fetches instructions form the new PC when issuing instructions next time.

Figure 5:
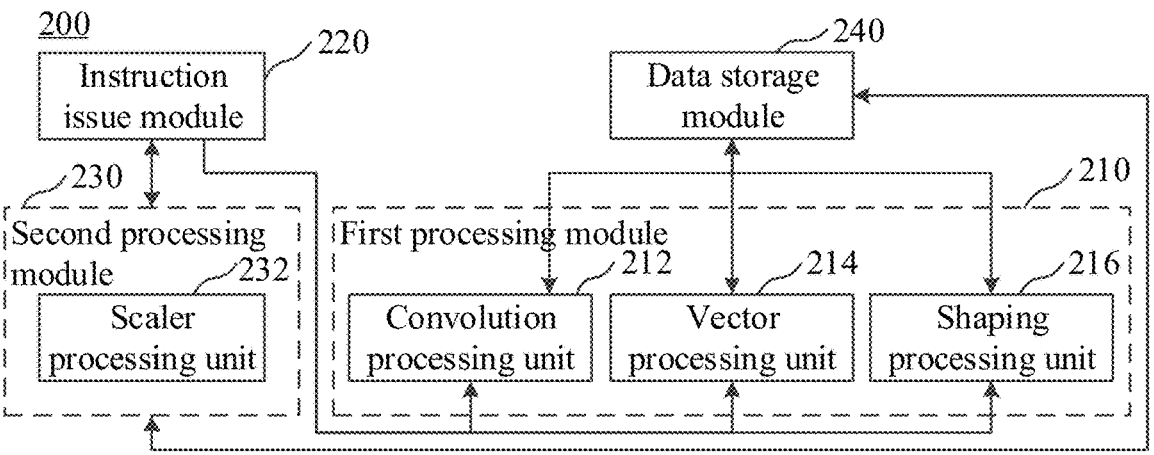
FIG. 5 is a schematic diagram showing a fifth structure of a neural network processor according to an embodiment of the disclosure.

FIG. 5 illustrates a fifth structure of a neural network processor according to an embodiment of the application. A neural network processor 200 provided by this embodiment further includes a data storage module (also referred to as Buffer, BUF) 240. The data storage module 240 is configured to store data, such as image data, weight data, etc.

The data storage module 240 is in communication with both of a first processing module 210 and a second processing module 230. For instance, the data storage module 240 is connected to each of a scalar processing unit 232, a convolution processing unit 212, a vector processing unit 214, and a shaping processing unit 216. The data storage module 240 can transmit data to each of the scalar processing unit 232, the convolution processing unit 212, the vector processing unit 214, and the shaping processing unit 216. For instance, the data storage module 240 can transmit data directly to each of the scalar processing unit 232, the convolution processing unit 212, the vector processing unit 214, and the shaping processing unit 216. Thus, this embodiment of the application can realize direct data transmission between the data storage module 240 and every processing unit such as the convolution processing unit 212 and the vector processing unit 214, thereby improving the performance of the neural network processor 200.

The data processing performed by the first processing module 210 may be as follows in detail. When the convolution processing unit 212 and the vector processing unit 214 receive instructions issued in parallel by the instruction issue module 220, such as the first calculation instruction and the second calculation instruction, the convolution processing unit 212 and the vector processing unit 214 can read data required to be processed such as data to-be-processed from the data storage module 240, then the convolution processing unit 212 and the vector processing unit 214 perform processing operations on the data to-be-processed to obtain one or more processing results, finally the processing results are stored in the data storage module 240.

The data processing performed by the convolution processing unit 212 and the vector processing unit 214 may be as follows in detail. When the convolution processing unit 212 receives one or more instruction issued by the instruction issue module 220, such as a first calculation instruction, the convolution processing unit 212 reads data required to be processed by itself, such as the data to-be-processed, form the data storage module 240. After reading the data required to be processed, the convolution processing unit 212 performs, according to the first calculation instruction, a corresponding operation such as a dot product calculation to obtain an intermediate calculation result. The convolution processing unit 212 may store the intermediate calculation result into the data storage module 240. Then, the vector processing unit 214 may acquire the intermediate calculation result from the data storage module 240, and perform a second calculation process such as a pooling operation on the intermediate calculation result, so as to obtain the processing result, and then the processing result is stored in the data storage module 240.

Data stored in the data storage module 240 may include raw data and weight data, such as the data to-be-processed. In other words, the data stored in the data storage module 240 requires at least one processing unit for processing such as arithmetic processing. The data stored in the data storage module 240 may also include one or more processing result, in other words, the data stored in the data storage module 240 has been processed by at least one processing unit. It should be noted that the data actually stored in the data storage module 240 is not limited to this, and the data storage module 240 may also store other data.

It should be noted that the data processing performed by the convolution processing unit 212 and the vector processing unit 214 is not limited to this. The convolution processing unit 212 and the vector processing unit 214 may be directly connected to each other through a signal line.

The data processing performed by the convolution processing unit 212 and the vector processing unit 214 may also be as follows in detail. When the convolution processing unit 212 receives one or more instructions issued by the instruction issue module 220, such as the first calculation instruction, the convolution processing unit 212 reads the data required to be processed by itself, such as the data to-be-processed, from the data storage module 240. After the convolution processing unit 212 reads the data to-be-processed from the data storage module 240, the convolution processing unit 212 performs, according to the first calculation instruction, a corresponding operation such as a dot product calculation to obtain an intermediate calculation result. The convolution processing unit 212 transmits the intermediate calculation result to the vector processing unit 214. Then the vector processing unit 214 performs a second calculation process on the intermediate calculation result, such as pooling processing, subsequent activation, quantization operation, or being blended with an operation of a next layer to simultaneously process operations of the two layers, thereby to obtain the processing result. Finally, the processing result is stored in the data storage module 240.

It should be noted that the convolution processing unit 212 may also be connected to one or more other processing units of the first processing module 210, such as a shaping processing unit 216, through a signal line. The data processing performed by the first processing module 210 may also include that, the convolution processing unit 212 directly transmits the intermediate calculation result to the shaping processing unit 216 or other processing units included in the first processing module 210, to perform other calculation operations. The data processing performed by the first processing module 210 may also include the follows: the convolution processing unit stores the intermediate calculation result to the data storage module 240; the shaping processing unit 216 or other processing units included in the first processing module 210 acquire the intermediate calculation result and performs a further processing operation such as a shaping processing operation, so as to obtain the processing result; and finally the shaping processing unit 216 or other processing units included in the first processing module 210 store the processing result in the data storage module 240.

During the processing units of the first processing module 210 transmit data therebetween for processing, the intermediate calculation result may not be stored in the data storage module 240. That is, the data storage module 240 store raw data and weight data, rather than the intermediate calculation result. This not only saves the dedicated space of the data storage module 240, but also reduces access to the data storage module 240, so the power consumption is reduced and the performance of the neural network processor 200 is improved.

The manner of processing data among other processing units included in the first processing module 210 can be referred to the manner of processing data between the convolution processing unit 212 and the vector processing unit 214 as described above. And the manner of processing data among other processing units included in the first processing module 210 is not illustrated one by one here again.

The data storage module 240 of the embodiment can store calculation results. During operation processes of the processing units, 0 fallback can be achieved to the external memory, and there is no need to fallback a settlement result of a previous operator to the external memory. The bandwidth requirement for soc is relatively low, thereby saving the system bandwidth and reducing the calculation delay among operators.

In some embodiments, the data storage module 240 may be a shared storage module. The data storage module 240 may have a number of Banks that can be accessed in parallel, e.g., three Banks, four Banks, and so on. The data storage module 240 can be divided flexibly according to practical requirements.

Figure 6:
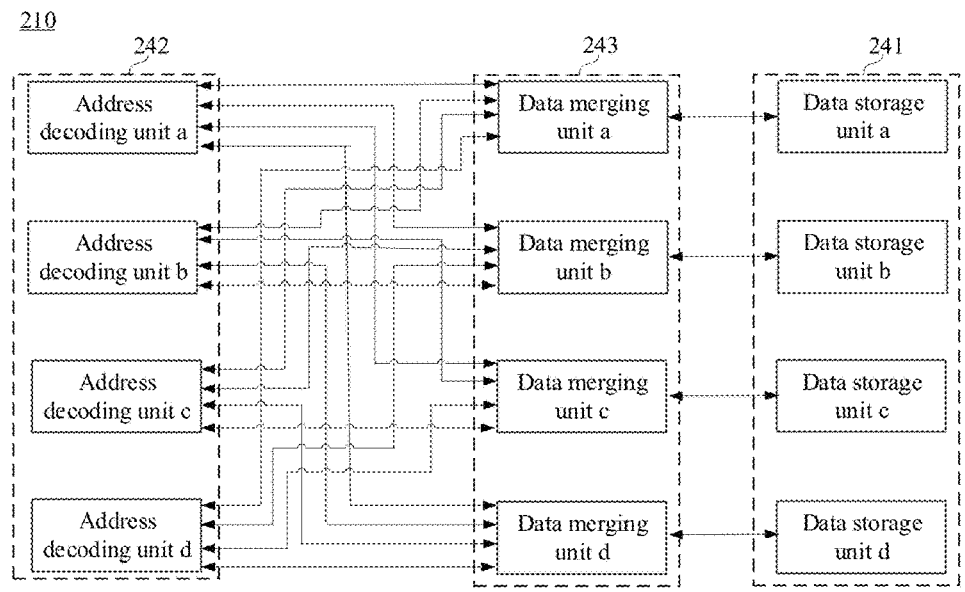
FIG. 6 is a structural diagram of a data storage module according to an embodiment of the disclosure.

FIG. 6 illustrates a schematic structure of a data storage module according to an embodiment of the application. The data storage module 240 includes at least two data storage units 241 and at least two address decoding units 242. The number of the address decoding units 242 is not greater than the number of the data storage units 241. For example, the number of the data storage units 241 is four, and the number of the address decoding units 242 is four. Each address decoding unit includes four output ports, each of which corresponds to one of the data storage units 241. Four data storage units 241, for example, are a data storage unit a, a data storage unit b, a data storage unit c, and a data storage unit d. Four address decoding units 242, for example, are an address decoding unit a, an address decoding unit b, an address decoding unit c, and an address decoding unit d.

The four address decoding units 242 are all connected to one of the data storage units 241. Each address decoding unit 242 includes four output ports. The number of the output ports of every address decoding unit 242 is equal to the number of the data storage units included in the data storage module 240. That is, the output ports of each address decoding unit 242 correspond to the data storage units 241 one by one. For example, among the four output ports of each address decoding unit, a first output port corresponds to the data storage unit a, a second output port corresponds to the data storage unit b, a third output port corresponds to the data storage unit c, and a fourth output port corresponds to the data storage unit d.

The data output from one output port is configured to be stored into a corresponding data storage unit. For example, the data storage unit a stores the following: data output from the first output port corresponding to the data storage unit a in the address decoding unit a, data output from a first output port corresponding to the data storage unit a in the address decoding unit b, data output from a first output port corresponding to the data storage unit a in the address decoding unit c, and data output from a first output port corresponding to the storage unit a in the address decoding unit d. Thus, data of each address decoding unit can be stored in any of the data storage units 241, thereby realizing the sharing among the data storage units 241.

One output port is used to output one data type. The four output ports of a same address decoding unit 242 correspond to different data types. For example, the first output port of each address decoding unit 242 is used to output characteristic maps, and the second output port of each address decoding unit 242 is used to output characteristic parameters.

Each address decoding unit 242 also includes three input ports, and the three input ports are respectively used to receive signals, data, and address information transmitted from external ports. Each address decoding unit 242 compiles, according to the received signal, data, and address information, to form four data.

The number of the address decoding units 242 is consistent with the number of the external ports. For example, when the number of the external ports is four, the number of the address decoding units 242 is four correspondingly. Data transmitted from the external ports can be stored to any one of the data storage units 241 through the address decoding units 242, thereby realizing the resource sharing in the data storage module 240. The external ports may be ports of one or more processing units or may be ports of a data bus, any port that can store data into the data storage unit and read data from the data storage unit is within the protection scope of the embodiments of the application.

The data storage module 240 further includes at least two data merging units 243, e.g., four data merging units 243. Each data merging unit 243 includes at least two data input ports and one data output port. Each data merging unit 243 receives all data corresponding to one data storage unit 241 through the at least two data input ports, processes all the data, and stores the processed data into corresponding data storage unit 241, thereby realizing that the data storage module 240 regularly processes the data, improving the efficiency of data processing, and avoiding the phenomenon of data storage chaos.

Each data merging unit 243 corresponds to one data storage unit 241. One data input port of each data merging unit 243 is connected to output ports of all address decoding units 242 that correspond to one data storage unit 241, that is, each data merging unit 243 connects all address decoding units 242. By using one data merging unit 243 to process data of multiple address decoding units 243, the efficiency of data storage is improved.

The data merging unit 243 adopts bitwise_or operations to count data, the bitwise_or operation is a binary operation. As long as one of corresponding two binary bits is 1, the result bit is 1. The bitwise_or operation logic has relatively simple logic and relatively fast operation speed, which can improve the processing efficiency of the data merging unit 243 and the storage efficiency of the data storage module 240 furthermore.

One data merging unit 243 corresponds to one data storage unit 241. For example, a data merging unit a corresponds to the data storage unit a, a data merging unit b corresponds to the data storage unit b. A piece of data, decoded and formed by the address decoding unit a, is transmitted to a data merging unit a corresponding to the data storage unit a to be processed, and the processed data can be transmitted to the data storage unit a and then stored therein, so that fast and efficient data storage by the data storage module 240 can be realized.

It should also be noted that, a second processing module 230 such as a scalar processing unit 232 may not acquire the data required to be processed from the data storage module 240, and the data required to be processed by the scalar processing unit 232 may be carried by one or more received instructions or transmitted by other manners.

Figure 7:
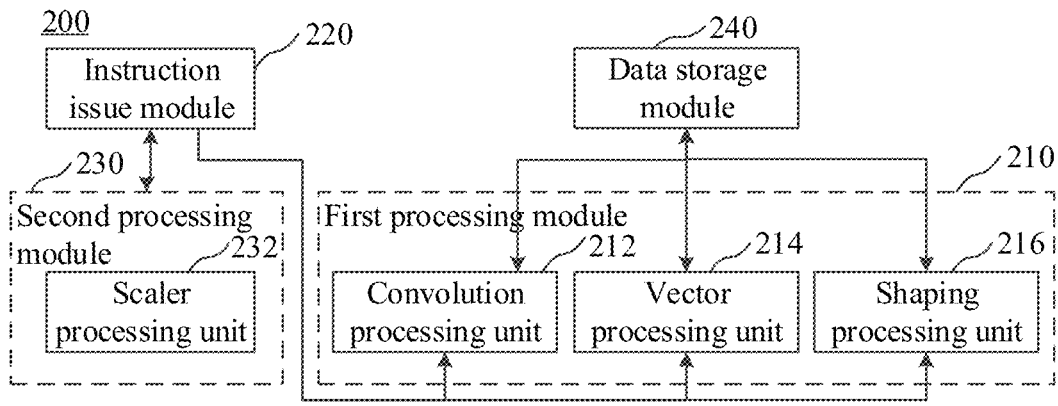
FIG. 7 is a schematic diagram showing a sixth structure of a neural network processor according to an embodiment of the disclosure.

FIG. 7 illustrates a sixth structure of a neural network processor according to an embodiment of the application. A neural network processor illustrated in FIG. 7 is different form the neural network processor illustrated in FIG. 5 as follows. In FIG. 7, a second processing module 230 such as a scalar processing unit 232 is connected to an instruction issue module 220 and not connected to a data storage module 240. In FIG. 5, the second processing module 230 such as the scalar processing unit 232 is connected to both of the instruction issue module 220 and the data storage module 240. In FIG. 7, the second processing module 230 such as the scalar processing unit 232 acquires the data required to be processed from its' received instruction, in other words, the data required to be processed by the second processing module 230 such as the scalar processing unit 232 in FIG. 7 is carried by one or more instructions issued by the instruction issue module 220. This embodiment may also provide a separate data storage module for the second processing module 230 such as the scalar processing unit 232.

It should be noted that the data storage module 240 may also be connected to the instruction issue module 220, and the instruction issue module 220 determines whether to issue one or more instructions according to whether the data storage module 240 has data to-be-processed stored therein.

Figure 8:
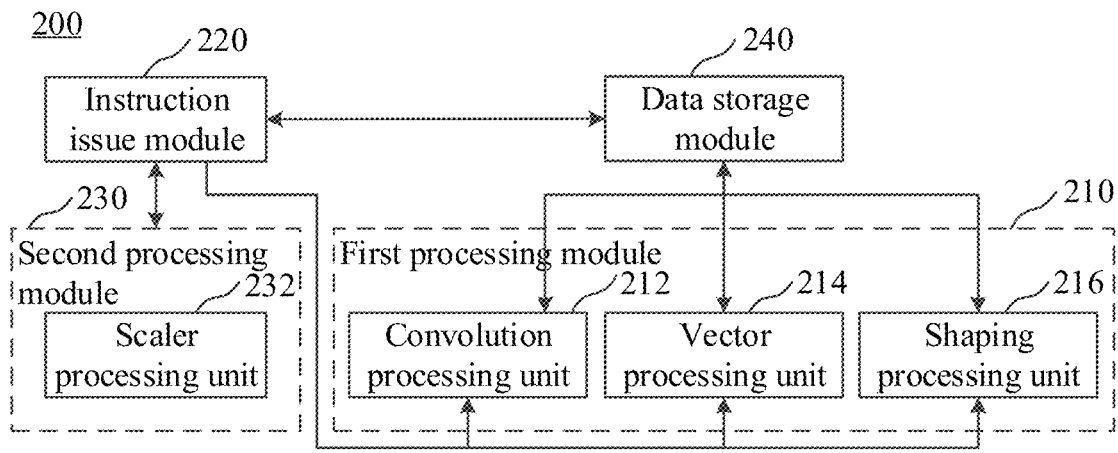
FIG. 8 is a schematic diagram showing a seventh structure of a neural network processor according to an embodiment of the disclosure.

FIG. 8 illustrates a seventh structure of a neural network processor according to an embodiment of the application. An instruction distribution module 220 is connected to a data storage module 240. The instruction issue module 220 can send an index to the data storage module 240, and the data storage module 240 returns a signal according to the index sent by the instruction issue module 220. When the data storage module 240 has data to-be-processed stored therein, the data storage module 240 returns to the instruction issue module 220 a signal, which indicates that has the data to-be-processed stored therein, such as "1". When the data storage module 240 has no data to-be-processed stored therein, the data storage module 240 returns to the instruction issue module 220 a signal, which indicates that has no data to-be-processed stored therein, such as "0".

The instruction issue module 220 takes different actions according to different return signals it receives. For example, when the instruction issue module 220 receives "1", the instruction issue module 220 determines that the data storage module 240 has the data to-be-processed stored therein, and then the instruction issue module 220 issues multiple instructions in parallel. When the instruction issue module 220 receives "0", the instruction issue module 220 determines that the data storage module 240 does not store the data to-be-processed, and the instruction issue module 220 does not issue instructions to the data storage module 240 at this time. Therefore, unnecessary instruction issue can be avoided and power consumption can be saved.

Figure 9:
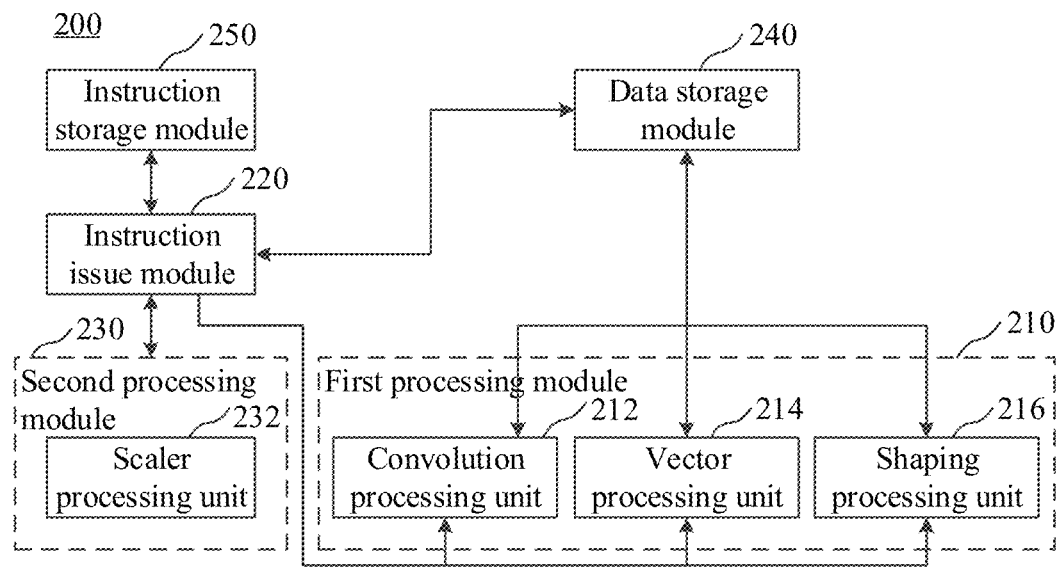
FIG. 9 is a schematic diagram showing an eighth structure of a neural network processor according to an embodiment of the disclosure.

FIG. 9 illustrates an eighth structure of a neural network processor according to an embodiment of the application. A neural network processor 200 provided in the embodiment of the application further includes an instruction storage module 250, which may also be referred to as an instruction cache (ICache). The instruction storage module 250 may store some fine-grained instructions, such as calculation instructions and control instructions. In other words, the instruction storage module 250 is configured to store instructions of the neural network processor 200. It should be noted that the instruction storage module 250 can also tore other instructions. The instruction storage module 250 is connected to an instruction issue module 220, and the instruction storage module 250 can send its' stored instructions to the instruction issue module 220. In other words, the instruction issue module 220 can acquire multiple instructions from the instruction storage module 250.

Processes of the instruction issue module 220 acquiring instructions from the instruction storage module 250 may be as follows. The instruction issue module 220 sends an instruction fetch request to the instruction storage module 250, when an instruction corresponding to the instruction fetch request is found in the instruction storage module 250, that is referred to as Instruction Hit, the instruction storage module 250 sends the instruction corresponding to the instruction fetch request to the instruction issue module 220 in response to the instruction fetch request. Otherwise, when the instruction corresponding to the instruction fetch request is not found in the instruction storage module 250, which is referred to as Instruction Miss, the instruction storage module 250 suspends/holds to response to the instruction fetch request, meanwhile, the instruction storage module 250 sends an instruction acquiring request and waits the instruction to return to the instruction storage module 250, then the instruction storage module 250 sends the instruction corresponding to the instruction fetch request to the instruction issue module 220 in response to the instruction fetch request.

Processes of the instruction issue module 220 acquiring instructions from the instruction storage module 250 can be as follows. When the instruction storage module stores instructions required by the instruction issue module 220 therein, the instruction issue module 220 may directly obtain the instructions from the instruction storage module 250. When at least one instruction required by the instruction issue module 220 is not in the instruction storage module 250, the instruction storage module 250 needs to read the at least one instruction required by the instruction issue module 220 from other locations, such as an external memory, and returns the at least one instruction to the instruction issue module 220.

It should be noted that the instruction issue module 220 and the instruction storage module 250 in the embodiment of the application may be two separate parts. Of course, the instruction issue module 220 and the instruction storage module 250 may constitute an instruction preprocessing module, in other words, the instruction issue module 220 and the instruction storage module 250 may be two parts of the instruction preprocessing module.

It should also be noted that each instruction stored in the instruction storage module 250 has a corresponding type, and the instruction issue module 220 may issue multiple instructions based on the type of instruction. For example, the instruction issue module 220 issues one or more instructions of a first type to a convolution processing unit 212, and the instruction issue module 220 issues one or more instructions of a second type to a scalar processing unit 232. The type of instruction may be any one of, a jump instruction, a branch instruction, a convolution calculation instruction, a vector calculation instruction, a shaping calculation instruction and the like.

The instruction storage module 250 of the embodiment is not limited to store a part of instructions of the neural network processor 200. The instruction storage module 250 of the embodiment can also store all instructions of the neural network processor 200, and the instruction storage module 250 may be called an Instruction RAM (IRAM) or a program memory. Upper-level software such as an external processor can directly write one or more programs to the IRAM.

Figure 10:
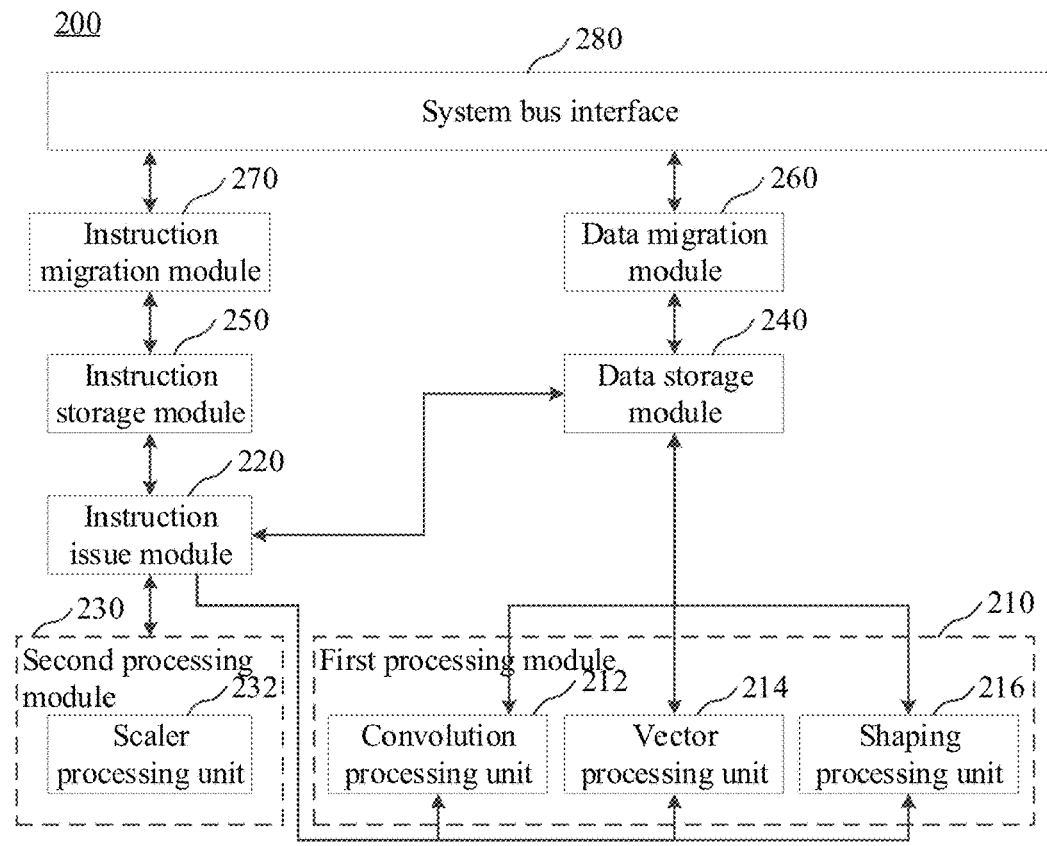
FIG. 10 is a schematic diagram showing a ninth structure of a neural network processor according to an embodiment of the disclosure.

FIG. 10 illustrates an eighth structure of a neural network processor according to an embodiment of the application. A neural network processor 200 provided by this embodiment further includes a data migration module 260, an instruction migration module 270, and a system bus interface 280.

The system bus interface 280 is connected to a system bus, which may be a system bus of an electronic device such as a smart phone. The system bus interface 280 is connected to the system bus to realize data transmission with other processors and external memories. The system bus interface 280 can convert internal write/read requests into bus write/read requests that comply with a bus interface protocol, such as an advanced extensible interface (AXI) protocol.

The data migration module 260 is connected between the system bus interface 280 and the data storage module 240. The data migration module 260 is configured to move data, it can move external data to the data storage module 240, it also can move data from the data storage module 240 to the external. For example, the data migration module 260 reads data from the system bus through the system bus interface 280 and writes the read data to the data storage module 240. The data migration module 260 may also transmit data or processing results stored in the data storage module 240 to the external memory. For example, the data migration module 260 transmits the processing results of every processing unit of a first processing module 210 to the external memory. That is, the data migration module 260 can implement data migration between the internal and the external through the system bus interface 280.

The data migration module 260 may be a direct memory access (DMA), and the DMA can move data from one address space to another address space. The address space for data transfer can be an internal memory or a peripheral interface. Usually, a descriptor configured to control the data migration of the DMA data stored in a RAM in advance, and the descriptor includes information such as a source address space, a destination address space, a data length and the like. The DMA is initialized by one or more software and then the data starts to be moved. The process of data migration can be carried out independently from the neural network processor 200, thereby improving the efficiency of the neural network processor 200 and reducing the burden of the neural network processor 200.

The instruction migration module 270 is connected between the system bus interface 280 and the instruction storage module 250. The instruction migration module 270 is configured to move instructions, in other words, the instruction migration module 270 is configured to read instructions so as to move external instructions to the instruction storage module 250. For example, the instruction migration module 270 reads one or more instructions from the system bus through the system bus interface 280 and stores the read instructions in the instruction storage module 250. When Instruction Miss is occurred in the instruction storage module 250, the instruction storage module 250 will request the instruction migration module 270 to send a read instruction request to the system bus interface 280 to read a corresponding instruction and store it in the instruction storage module 250. The instruction migration module 270 may also be a DMA. Of course, the instruction storage module 250 can also directly write all instructions to the instruction storage module 250 through the instruction migration module 270.

Figure 11:
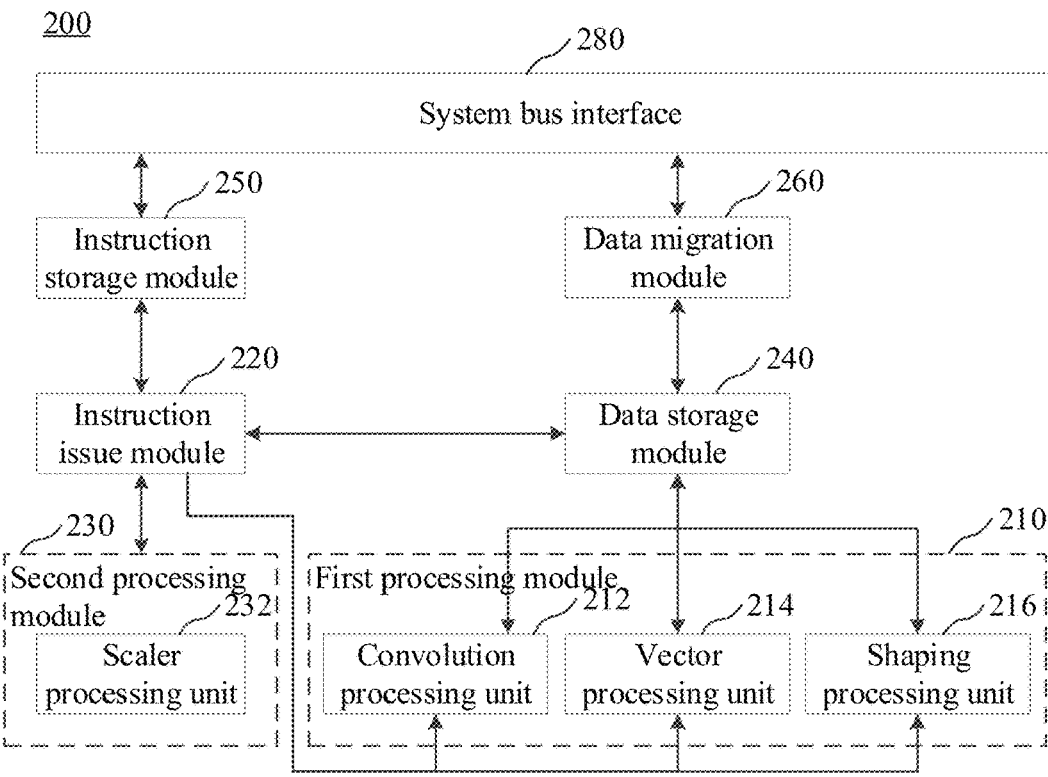
FIG. 11 is a schematic diagram showing a tenth structure of a neural network processor according to an embodiment of the disclosure.

FIG. 11 illustrates a ninth structure of a neural network processor according to an embodiment of the application. FIG. 11 illustrates that an instruction storage module 250 is connected to a system bus interface 280, thus an external memory can directly store one or more programs or instructions required by a neural network processor 200 to the instruction storage module 250.

It should be noted that when the instruction storage module 250 is an IRAM, the instruction storage module 250 can also be connected to the external memory through other interfaces. In this way, it is convenient for the external memory to directly write instructions or programs into the instruction storage module 250, in other words, it is convenient for the initialization of instruction.

Therefore, the data migration module 260 and the instruction migration module 270 in this embodiment are two separate unit modules, the data migration module 260 and the instruction migration module 270 implement the transfer or the migration, of data and instructions, respectively. In other words, this embodiment of the application needs to dispose two DMAs to realize the movement of data and instructions. The data migration module 260 needs to define one or more logical channels, and the instruction migration module 270 needs to define one or more physical channels. Here, the instruction migration module 270 is taken as an example for description.

For example, the data migration module 260 may be a separate DMA, which is defined as DMA1 here; the instruction migration module 270 may be another separate DMA, which is defined as DMA2 here. That is, the DMA1 is configured to move data, and the DMA2 is configured to move instructions.

Figure 12:
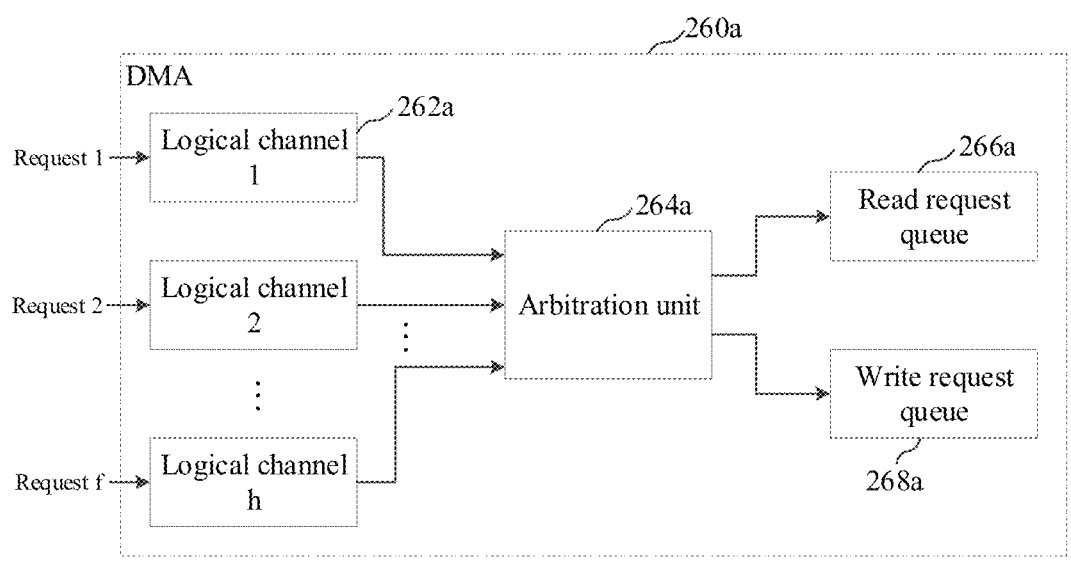
FIG. 12 is a schematic diagram showing a first structure of a Direct Memory Access (DMA) in a neural network process according to an embodiment of the disclosure.

FIG. 12 illustrates a first structure of a DMA in a neural network processor according to an embodiment of the application. A DMA 260a illustrated in the FIG. 12, is equivalent to a partial structure of a data migration module 260. The DMA 260a includes a number of logical channels 262a and an arbitration unit 264a. The logical channels 262a each are connected to the arbitration unit 264a, and the arbitration unit 264a can be connected to a system bus through a system bus interface. It should be noted that the arbitration unit 264a may also be connected to, through other interfaces, at least one of a peripheral device and a memory.

The number of the logical channels 262a may be h, where h is a natural number greater than 1, that is, there are at least two logical channels 262a. Each logical channel 262a can receive one or more data migration requests such as a request 1, a request 2, and a request f, and perform one or more data migration operations based on the one or more received data migration requests.

Each logical channel 262a of the DMA 260a can achieve functions such as generating, parsing, and controlling a descriptor, and details can be determined according to the composition of the request. When several logical channels 262a simultaneously receive their respective data migration request, the arbitration unit 264a can select one request, to enter into a read request queue 266a and a write request queue 268a, waiting for data migration.

The logic channel 262a needs software intervention. The software configures the descriptor or a register in advance, and completes initialization to move the data. All logical channels 262a of the DMA 260a are visible to the software and scheduled by the software. In some business scenarios, for example, when an internal engine such as an instruction issue module (also referred to as an instruction preprocessing module) autonomously transferring data without software scheduling, the logical channel 262a of this type of DMA 260a cannot be used. Thus, it is inconvenient to flexibly transplant according to business needs, and relies too much on the software scheduling.

Based on this, the application also provides a DMA to achieve different movement requirements.

Figure 13:
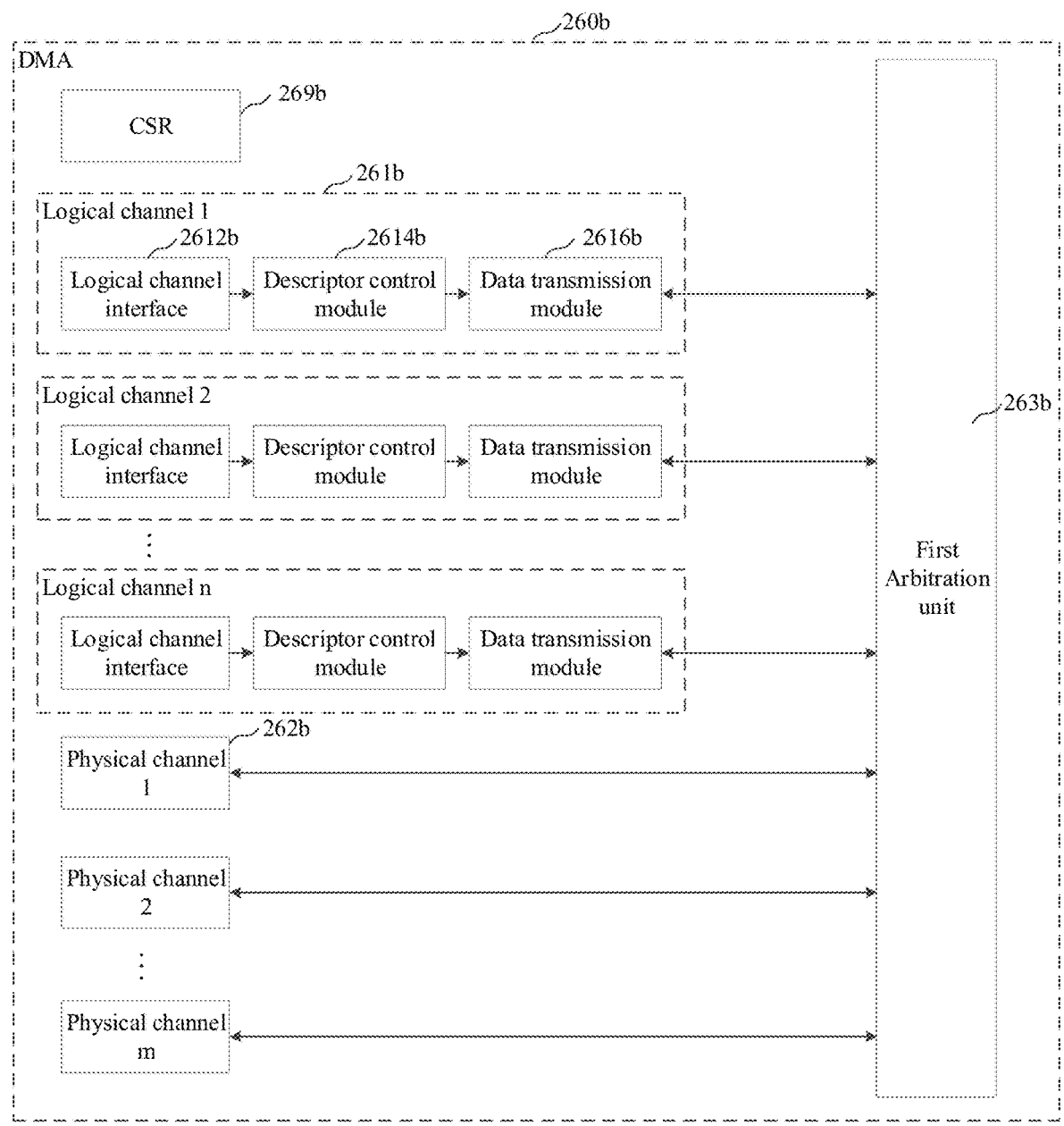
FIG. 13 is a schematic diagram showing a second structure of a DMA in a neural network process according to an embodiment of the disclosure.

FIG. 13 illustrates a second structure of a DMA in a neural network processor according to an embodiment of the application. A DMA 260b illustrated in FIG. 13 is functionally equivalent to an instruction migration module 270 and a data migration module 260, in other words, the DMA 260b illustrated in FIG. 13 combines the functions of the instruction migration module 270 and the data migration module 260. The DMA 260b may include at least one logical channel 261b and at least one physical channel 262b. The at least one logical channel 261b and the at least one physical channel 262b are parallel, which can also be understood as that the at least one logical channel 261b and the at least one physical channel 262b are connected to a same interface. Thus, the at least one physical channel 262b and the at least one logical channel 261b can transfer instructions and data in parallel. Since the instruction migration through the physical channel 262b is automatically requested by an internal engine such an instruction issue module, it does not need to be scheduled by upper-level software, thereby reducing the dependency of the entire DMA 260b on software scheduling, making it more convenient to move data, and improving the flexibility of the data migration according to business requirements. It is understood that, this embodiment just uses one DMA 260b to realize the migration of instructions and data, so the number of unit modules can be reduced.

The logical channel 261b can perform the data migration in response to a migration request scheduled by the upper-layer software. The upper-layer software may be a programmable unit, such as a central processing unit (CPU).

The number of the at least one logical channel 261b can be n, where n is a natural number greater than or equal to 1. For example, the number of the at least one logical channel 261b is one, two, three, etc. It should be noted that the actual number of the at least one logical channels 261b can be set according to actual product requirements.

The physical channel 262b can perform the data migration in response to a migration request from an internal engine, and the internal engine can be an instruction issue module (also referred to as an instruction preprocessing module) of a neural network processor.

The number of the at least one physical channel 262b may be m, where m is a natural number greater than or equal to 1. For example, the number of the at least one physical channels 262b is one, two, three, etc. It should be noted that the actual number of the at least one physical channel 262b can be set according to actual product requirements. In some embodiments, the number of the at least one logical channels 261b may be two, and the number of the at least one physical channels 262b may be one.

As illustrated in FIG. 13, the DMA 260b further includes a first arbitration unit 263b, and the first arbitration unit 263b is connected to the system bus interface.

Figure 14:
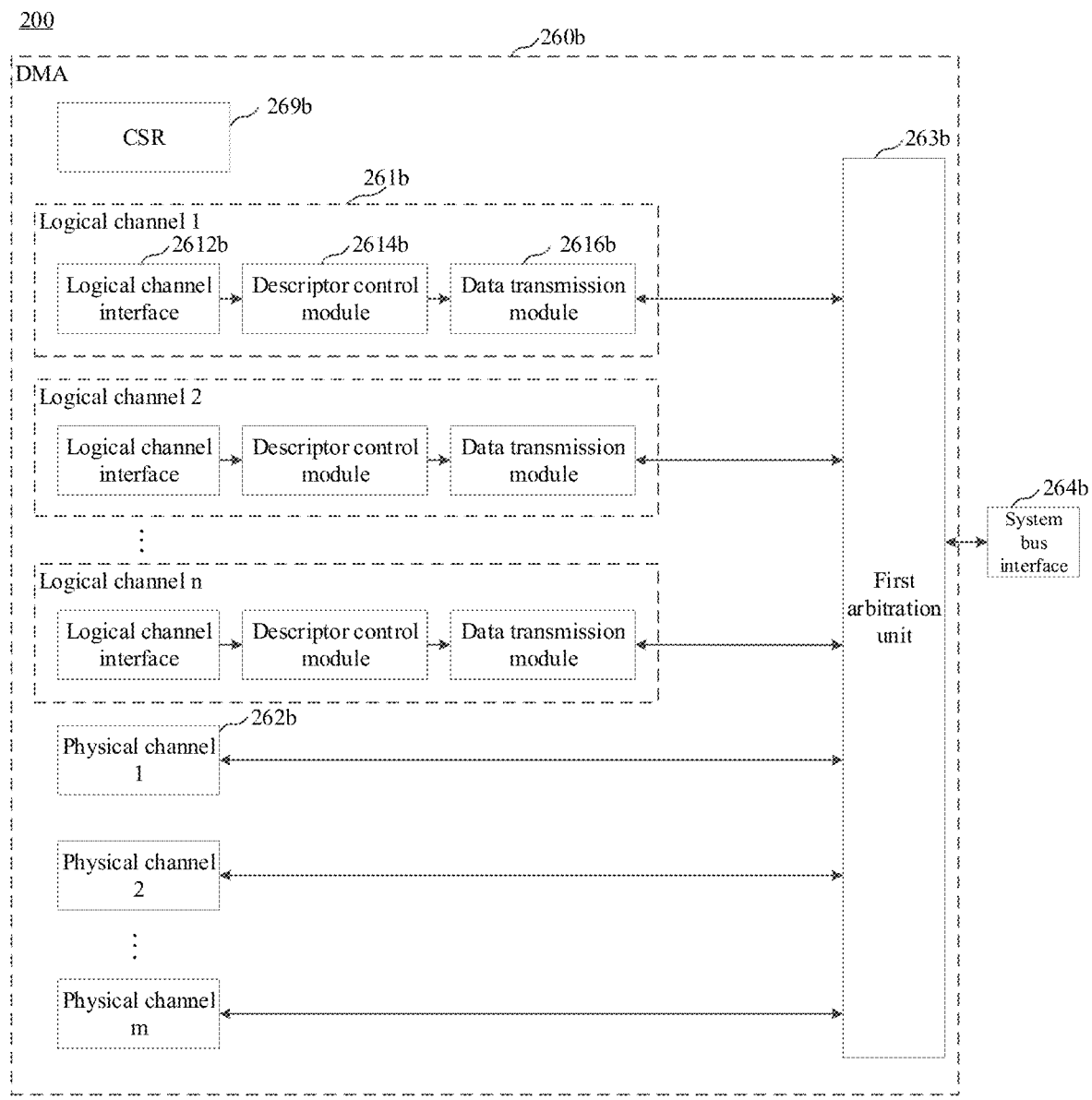
FIG. 14 is a schematic diagram showing an eleventh structure of a neural network processor according to an embodiment of the disclosure.

FIG. 14 illustrates an eleventh structure of a neural network processor provided by an embodiment of the application. A first arbitration unit 263b is connected to a system bus interface 264b. It can be understood that the system bus interface 264b may be equivalent to a system bus interface 280. The first arbitration unit 263b is connected to a system bus through the system bus interface 264b. The first arbitration unit 263b is further connected to all of at least one physical channel 262b and all of at least one logical channel 261b, so that the at least one logical channel 261b and the at least one physical channel 262b can transfer data and instruction from the system bus. When several channels simultaneously initiate their respective read/write request, the first arbitration unit 263b can arbitrate to determine which one read/write request should be sent to the system bus interface 264b. For example, when one logical channel 261b and one physical channel 262b simultaneously initiate a read/write request, the first arbitration unit 263b can determine the read/write request of the physical channel 262b should be sent to the system bus interface 264b, or the first arbitration unit 263b can determine the read/write request of the logical channel 261b should be sent to the system bus interface 264b.

The system bus interface 264b can be disposed outside the DMA 260b. It should be noted that the system bus interface 264b may also be provided in the DMB 260b, that is, the system bus interface 264b may be a part of the DMA 260b.

In some embodiments, the first arbitration unit 263b can reallocate the bandwidth of the at least one physical channel 262b and the at least one logical channel 261b.

In some embodiments, the logical channel 261b may include a logical channel interface 2612b, a descriptor control module 2614b, and a data transmission module 2616b. The logical channel interface 2612b can be connected to a data storage module such as the data storage module 240 shown in FIG. 5. The logical channel interface 2612b, the descriptor control module 2614b, and the data transmission module 2616b are connected in sequence. The data transmission module 2616b is further connected to the first arbitration unit 263b, so the data transmission module 2616b is connected with the system bus through the system bus interface 264b.

The logical channel interface 2612b can be determined by the format of one or more commands issued by the upper-layer software, and the logical channel interface 2612b can contain an address of a descriptor. The descriptor control module 2614b indexes the descriptor according to the one or more commands issued by the upper-layer software, analyzes data information such as a source address, a destination address, a data length and the like, and initiates a read and write data command to the data transmission module 2616b of the DMA 260b. The data transmission module 2616b receives the read and write data command from an upper layer (i.e., the descriptor control module 2614b), converts the read and write data command into one or more required signals which may be signals read first and write later, completes data migration, and returns a response to the descriptor control module 2614b.

Specific processes for the logical channel 261b transferring data are as follows.

A control status register (CSR) 269b of the DMA 260b is configured. It should be noted that the DMA 260b transferring data needs to clarify the following conditions: where the data is transferred from (i.e., the source address), where the data is transferred to (i.e., the destination address), and when the data is transferred (i.e., a trigger source, also referred to as a trigger signal). It is necessary to complete the configuration of various parameters and conditions of the DMA 260b to realize the data migration. The source address, the destination address and the trigger source can be set by the upper-level software.

In practical applications, the various parameters and the conditions of the DMA 260b can be defined in the CSR 269b, in other words, configuration information and parameters of the DMA 260b, such as a working mode, arbitration priorities, interface information, and the like can be set in the CSR 269b. In some embodiments, as an example, the CSR 269b configures an address of a peripheral register, an address of a data memory, an amount of data required to be transmitted, priorities between each channel, directions of data transmission, a cycle mode, an incremental mode of the peripheral and the memory, a data width of the peripheral and the memory, etc.

The upper-layer software issues a data migration command to the logical channel interface 261b of the DMA 260b, specifically to the logical channel interface 2612b. In the other words, the upper-layer software issues a data migration request to the logical channel interface 2612b of the logical channel 261b of the DMA 260b. When the programmable unit issues the data migration command to the logical channel 261b of the DMA 260b, it carries an address of the descriptor, or it directly carries the descriptor. The descriptor or the address of the descriptor is transmitted to the descriptor control module 2614b through the logical channel interface 2612b.

If the descriptor control unit 2614b receives the address of the descriptor, the descriptor control unit 2614b reads the descriptor according to the address of the descriptor. That is, the descriptor control unit 2614b indexes the descriptor. Then the descriptor is parsed, that is, information required for data migration is generated, such as a data source address space, a destination address space, the data length, etc. If the descriptor control unit 2614b receives a descriptor, the descriptor control unit 2614b directly parses the descriptor.

After the descriptor control unit 2614b parses the descriptor, the data transmission module 2616b can convert, following a principle of read first and write later, the generated information caused by the descriptor control unit 2614b parsing the descriptor into signals that the system bus interface 264b needs to be transmitted, and the signals are transmitted to the first arbitration unit 263b.

When the first arbitration unit 263b receives multiple read/write requests simultaneously initiated by multiple logical channels 261b, it can arbitrate and determine one to be sent to the system bus interface 264b.

When the first arbitration unit 263b simultaneously receives a read/write request initiated from the logical channel 261b and a read/write request initiated from the physical channel 262b, the first arbitration unit 263b can also arbitrate and determine the one to be sent to the system bus interface 264b, and the one is transmitted to the system bus through the system bus interface 264b.

After the read/write request of the DMA 260b is transmitted to the system bus, the system bus completes a read and write command, the data in the source address space is written into the destination address space, thereby completing the data migration.

The physical channel 262b may be connected to an internal engine such as an instruction issue module through an interface, and the interface may include configurations and parameters for instruction migration. Of course, the configurations and parameters of the physical channel 262b for instruction migration can also be configured by the CSR 269b.

It should be noted that the DMA 260b can also be connected with other components through other structures to realize the data migration.

Figure 15:
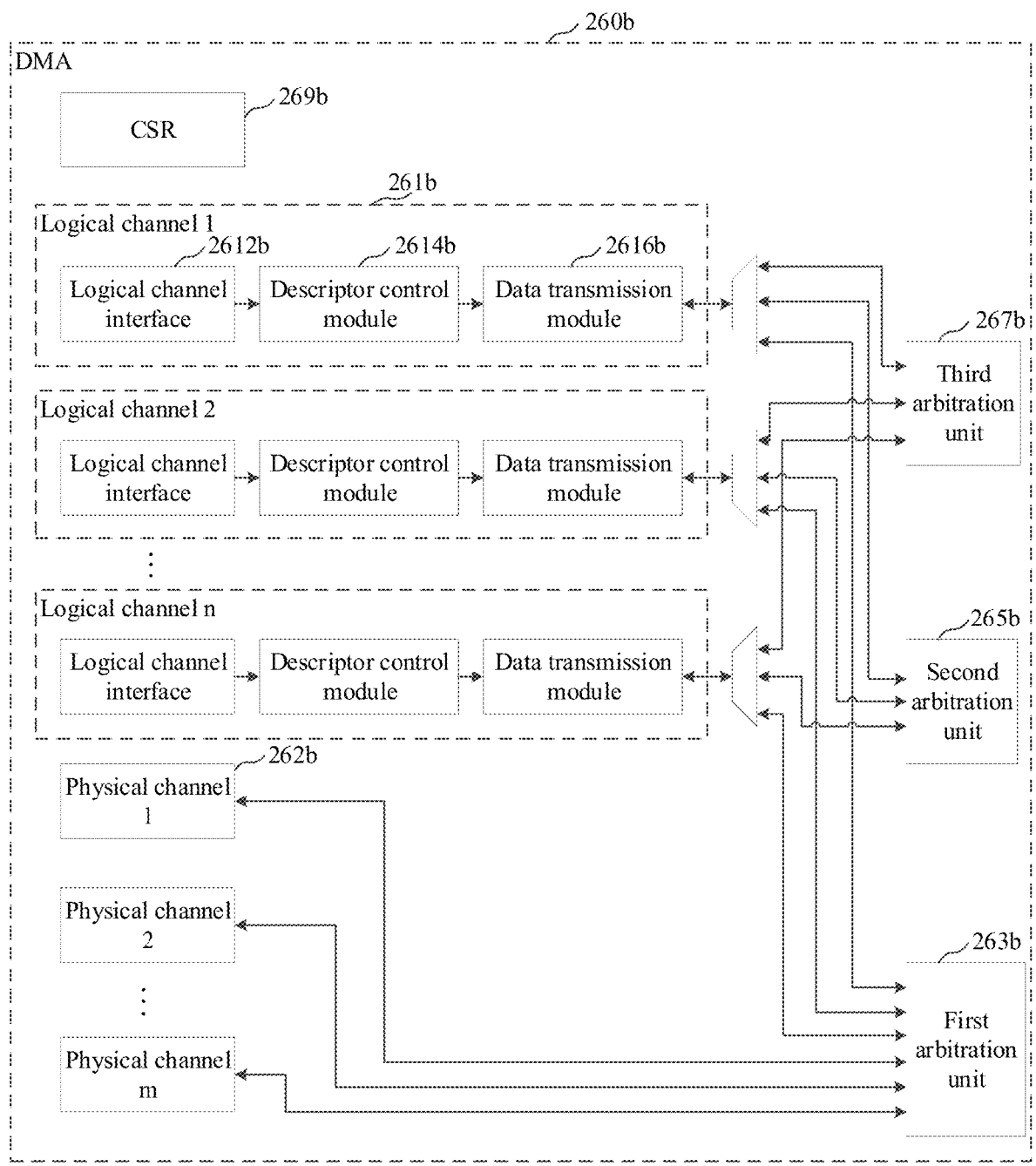
FIG. 15 is a schematic diagram showing a third structure of a DMA in a neural network process according to an embodiment of the disclosure.
Figure 16:
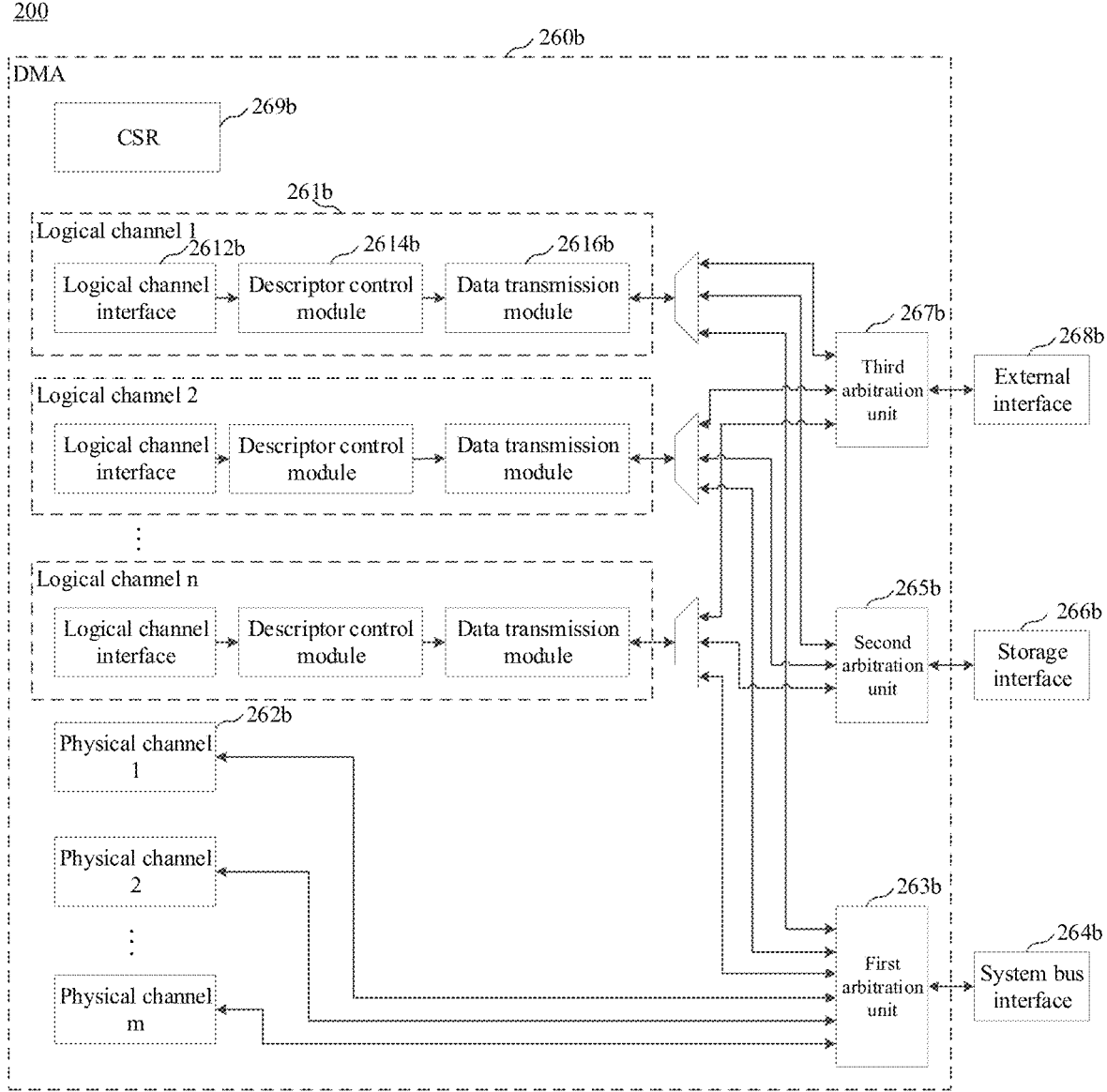
FIG. 16 is a schematic diagram showing a twelfth structure of a neural network processor according to an embodiment of the disclosure.

Please refer to FIGS. 15 and 16, FIG. 15 illustrates a third structure of a DMA in a neural network processor according to an embodiment of the application, and FIG. 16 illustrates a twelfth structure of a neural network processor provided by an embodiment of the application. A DMA 260b further includes a second arbitration unit 265b connected to a storage interface 266b. The storage interface 266b may be connected to a storage module (e.g., a memory, or a BUF). The storage module and the DMA 260b may or may not be located in a same neural network processor. For example, the DMA 260b is located in the neural network processor, the storage module may be located in the neural network processor or other devices. The second arbitration unit 265b can be connected to each logical channel 261b. When the first arbitration unit 263b and the second arbitration unit 265b are connected to a same logical channel 261b, they can be connected to said logical channel 261b through a selector. The storage interface 266b can be provided outside the DMA 260b or in the DMA 260b.

Please continue to refer to FIGS. 15 and 16, the DMA 260b may also include a third arbitration unit 267b connected to a peripheral interface 268b. The peripheral interface 268b can be connected to an external device. The external device and the DMA 260b are located in different devices. For example, the DMA 260b is located in the neural network processor, and the external device is a CPU. The third arbitration unit 267b can be connected to each logical channel 261b. When the first arbitration unit 263b and the third arbitration unit 267b are connected to the same logical channel 261b, they can be connected to said logical unit 261b through a selector. The peripheral interface 268b may be provided outside the DMA 260b or inside the DMA 260b.

Please still refer to FIGS. 15 and 16, the DMA 260b of the embodiments of the application may include the first arbitration unit 263b, the second arbitration unit 265b, and the third arbitration unit 267b at the same time. The first arbitration unit 263b is connected to the system bus interface 264b, the second arbitration unit 265b is connected to the storage interface 266b, and the third arbitration unit 267b is connected to the peripheral interface 268b. The first arbitration unit 263b, the second arbitration unit 265b, and the third arbitration unit 267b each are connected to the logical channel 261b. When the first arbitration unit 263b, the second arbitration unit 265b and the third arbitration unit 267b are connected to a same logical channel 261b, a selector may be connected between the logical channel 261b and the three arbitration units.

It should be noted that the embodiments of the application can provide other arbitration units to connect other components through other interfaces.

Figure 17:
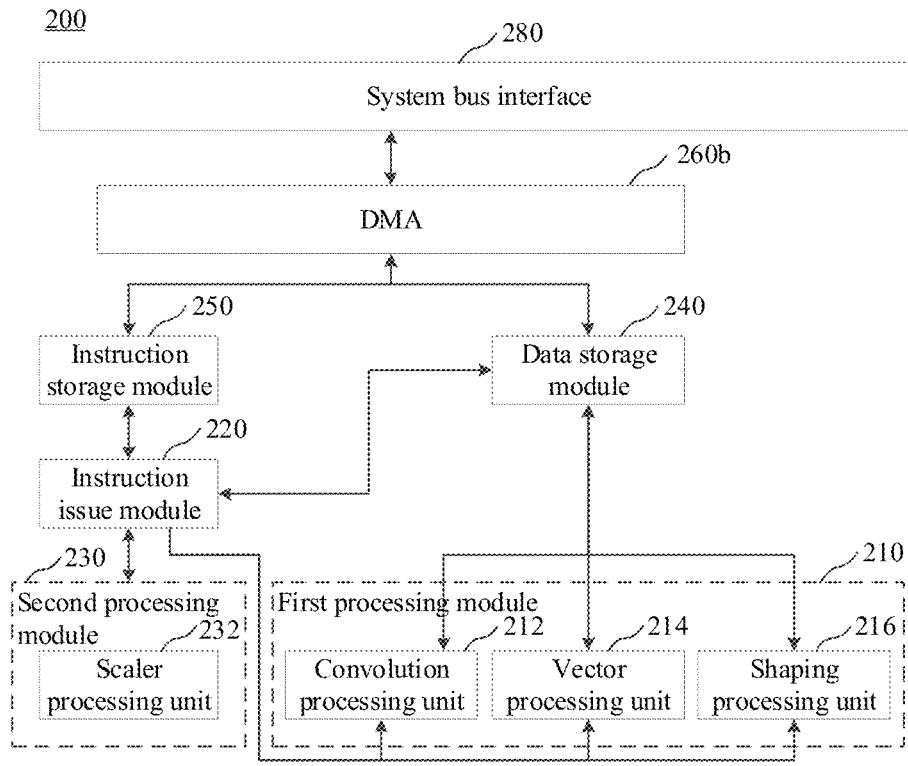
FIG. 17 is a schematic diagram showing a thirteenth structure of a neural network processor according to an embodiment of the disclosure.

FIG. 17 illustrates a thirteenth structure of a neural network processor according to an embodiment of the application. FIG. 17 illustrates a connection relationship between the DMA 260b shown in FIG. 13 or FIG. 15 and other elements of a neural network processor 200. The DMA 260b is connected to a system bus interface 280, an instruction storage module 250, and a data storage module 240. The DMA 260b can move data to the data storage module 240 through the system bus interface 280, can move instructions to the instruction storage module 250 through the system bus interface 280, and can also move data stored in the data storage module 240 to an external memory through the system bus interface 280.

In the embodiment, data of a first processing module 210 in the neural network processor 200 can be directly stored in the data storage module 240, and data of the data storage module 240 can also be loaded into the first processing module 210, thereby simplifying the program. However, in order to speed up a data access speed, the embodiments of the application may also add one or more general register between the data storage module 240 and the first processing module 210. The neural network processor having one or more general registers is described in detail below with reference to the drawings.

Figure 18:
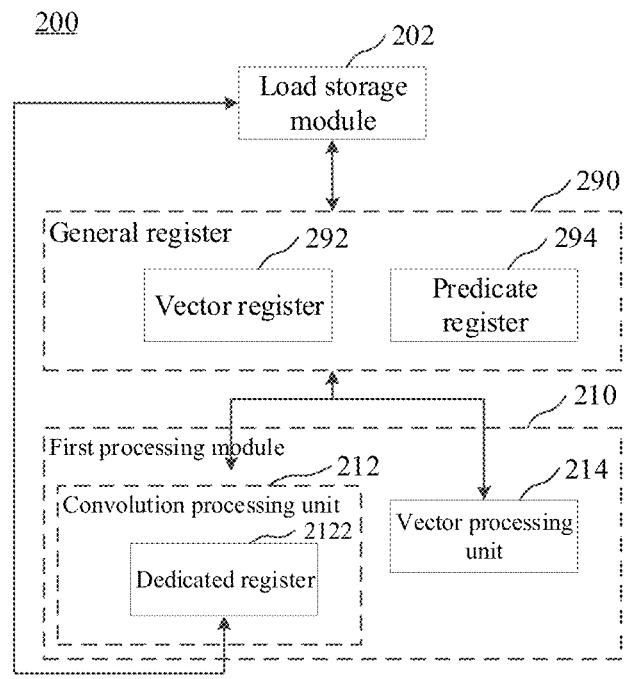
FIG. 18 is a schematic diagram showing a fourteenth structure of a neural network processor according to an embodiment of the disclosure.

FIG. 18 illustrates a fourteenth structure of a neural network processor according to an embodiment of the application. A neural network processor 200 may include a general register 290 and a load storage module 202.

The general register 290 is connected to a first processing module 210, and the general register 290 can be connected to all processing units of the first processing module 210. For example, the general register 290 is connected to a convolution processing unit 212 and a vector processing unit 214 of the first processing module 210. Both the convolution processing unit 212 and the vector processing unit 214 can obtain required data from the general register 290. Of course, both the convolution processing unit 212 and the vector processing unit 214 can also store their respective processing result into the general register 290. It should be noted that the number of the processing units included in the first processing module 210 is not limited to be as shown in FIG. 17, for example, the first processing module 210 may further include a shaping processing unit.

The general register 290 may include a plurality of registers. For example, the general register 290 includes a plurality of vector registers 292. For another example, the general register 290 includes a plurality of prediction registers 294. For still another example, the general register 290 includes the plurality of vector registers 292 and the plurality of prediction registers 294. The plurality of vector registers 292 may be referred to as a vector register file (VRF) for short. The plurality of prediction registers 294 may be referred to as a prediction register file (PRF) for short. The prediction register may also be referred to as a predicate register. The type and the number of registers included in the general register 290 can be set according to actual requirements, to improve the flexibility of software programming.

The convolution processing unit 212 may have one or more dedicated register 2122 that can store data therein. For example, there are two dedicated registers 2122 for the convolution processing unit 212, namely a first dedicated register and a second dedicated register, wherein the first dedicated register is configured to store image data, and the second dedicated register is configured to store weights.

A load store module (LSU) 202 is connected to the general register 290. The load store module 202 can load data into the general register 290, so that each processing unit of the first processing module 210 can obtain data from the general register 290. The load storage module 202 can also be connected to the dedicated registers 2122 of the convolution processing unit 212, and the load storage module 202 can directly load data into the dedicated registers 2122 of the convolution processing unit 212, so that the convolution processing unit 212 can perform processing such as convolution processing on the data, thereby increasing a data loading speed.

It should be noted that FIG. 18 only shows part components of the neural network processor 200, other components of the neural network processor 200 can be referred to FIGS. 1 to 17. In order to detailly describe a relationship of the load storage module 202, the general register 290 and other components of the neural network processor 200, the following description will be made in detail with reference to FIG. 19.

Figure 19:
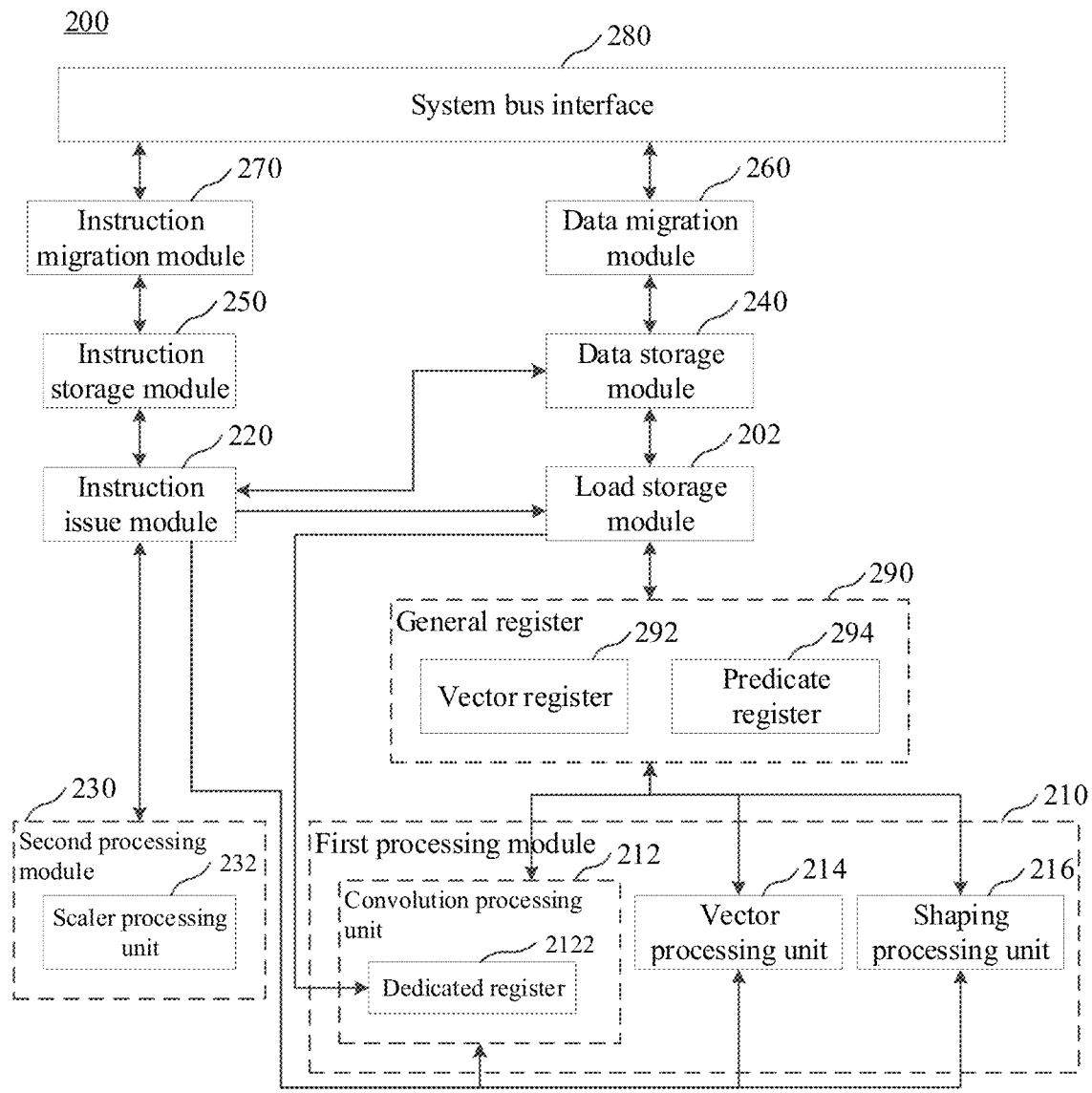
FIG. 19 is a schematic diagram showing a fifteenth structure of a neural network processor according to an embodiment of the disclosure.

FIG. 19 illustrates a fifteenth structure of a neural network processor according to an embodiment of the application. A load storage module (LSU) 202 is connected between a general register 290 and a data storage module 240. The load storage module 202 can load data of the data storage module 240 into the general register 290. Processing units of a first processing module 210, such as a convolution processing unit 212, a vector processing unit 214, and a shaping processing unit 216, can load data required to be processed from the general register 290 according to their respective instructions. The general register 290 may be connected with multiple processing units, for example, the general register 290 is connected with the convolution processing unit 212 and at least one of the vector processing unit 214 and the shaping processing unit 216. Therefore, the convolution processing unit 212, the vector processing unit 214, and the shaping processing unit 216 each can obtain the data required to be processed from the general register 290.

The convolution processing unit 212, the vector processing unit 214, and the shaping processing unit 216 each can also store their respective processing results into the general register 290. Furthermore, the load storage module 202 can store the processing results in the general register 290 to the data storage module 240, and the data storage module 240 can transmit the processing results to an external memory through a DMA or a data migration module 260.

It should be noted that, a second processing module 230 such as a scalar processing unit 232 in the embodiment is not connected to the general register 290. As described above, data required to be processed by the scalar processing unit 232 in the embodiment can be carried by its' received instruction. The scalar processing unit 232 in the embodiment may also be connected to the data storage module 240 to obtain the data required to be processed from the data storage module 240.

The load storage module 202 of the embodiment can not only store the data of the data storage module 240 in the general register 290, but can also load the data to other locations. For example, the load storage module 202 is further directly connected to the convolution processing unit 212, which can be understood that there is no general register 290 connected between the load storage module 202 and the convolution processing unit 212 as described above. The load storage module 202 being connected to the convolution processing unit 212 can be understood that the load storage module 202 is connected to one or more dedicated registers 2122 of the convolution processing unit 212, for example, the load storage module 202 is connected to one of the dedicated registers 2122 of the convolution processing unit 212, and the load storage module 202 can directly load data of the data storage module 240, such as weights, to said one of the registers 2122 of the convolution processing unit 212. It is understandable that the load storage module 202 can also directly load other data such as image data to said one of the dedicated registers 2122 of the convolution processing unit 212.

Therefore, the load storage module 202 of the embodiment can directly load the data of the data storage module 240 to the convolution processing unit 212, and the load storage module 202 can also store the data of the data storage module 240 into the general register 290, so that the processing units of the first processing module 210, such as the convolution processing unit 212, may obtain corresponding data from the general register 290 based on their respective received instructions. For example, the load storage module 202 can directly load first data to the convolution processing unit 212, the load storage module 202 can store second data into the general register 290, and the convolution processing unit 212 can obtain the second data from the general register 290. The type of the first data and the second data may be different, for example, the first data is weights and the second data is image data. Therefore, the convolution processing unit 212 of the embodiment can receive the data required to be processed from different channels. Compared with the convolution processing unit 212 receiving the data required to be processed from the same channel, the embodiment improves a data loading speed, thereby improving an operation rate of the neural network processor 200. Moreover, the embodiment can also simplify an instruction set and make it easy to implement. Meanwhile, the embodiment is convenient for optimizing a compiler.

It should be noted that, after the load storage module 202 directly loads the first data into the convolution processing unit 212 and loads the second data into the general register 290, another processing unit of the first processing module 210 such as the vector processing unit 214, may also be used to obtain the second data from the general register 290.

It should also be noted that, the load storage module 202 can also load other data such as third data to the general register 290, one or more processing units of the first processing module 210, such as the shaping processing unit 216 can obtain the third data form the general register 290. The type of the third data may be different from that of the first data and the second data.

The load storage module 202 is also connected to an instruction issue module 220. The load storage module 202 can receive one or more instructions issued by the instruction issue module 220. The load storage module 202 can store, according to the instructions issued by the instruction issue module 240, the data of the data storage module 240 into the general register 290 or/and load the data of the data storage module 240 to the convolution processing unit 212. The load storage module 202 can also store, according to the instruction issued by the instruction issue module 240, the processing result stored in the general register 290 to the data storage module 240. The processing result is, for example, from the vector processing unit 214.

It should be noted that the instruction issue module 220 can issue, in parallel, a number of instructions to the first processing module 210, the second processing module 230, and the load storage module 202 within one clock cycle. For example, the instruction issue module 220 can multi-issue instructions to the scalar processing unit 232, the convolution processing unit 212, the vector processing unit 214, and the load storage module 202 in parallel within one clock cycle.

The load storage module 202 and the data storage module 240 can be integrated together, and serve as two parts of one module. Of course, the load storage module 202 and the data storage module 240 may also be provided separately, in other words, the load storage module 202 and the data storage module 240 are not integrated in one module.

Figure 20:
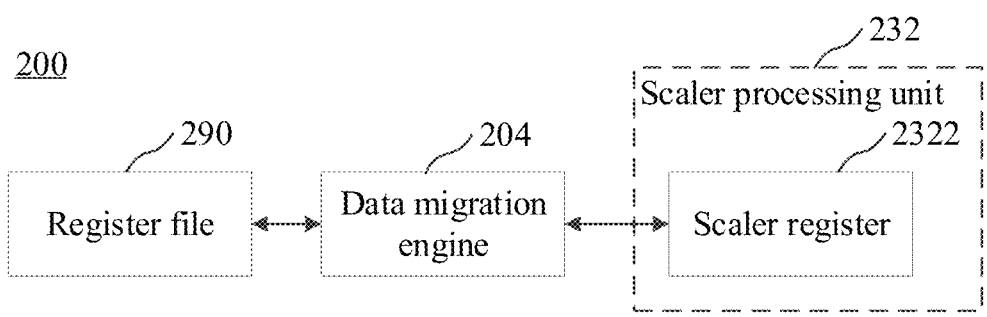
FIG. 20 is a schematic diagram showing a sixteenth structure of a neural network processor according to an embodiment of the disclosure.

FIG. 20 illustrates a sixteenth structure of a neural network processor according to an embodiment of the application. A neural network processor 200 further includes a data migration engine 204. The data migration engine 204 may also be referred to as a register file data movement engine (MOVE for short). The data migration engine 204 can realize data migration between different registers, so that one or more processing units of a first processing module 210, such as a convolution processing unit 212, and one or more processing units of a second processing module 230, such as a scalar processing unit 232, obtain data required to be processed from the internal of the neural network processor 200. The obtained data is processed. So that the data does not need to be transmitted to the external of the neural network processor 200, processed by upper-layer software and then returned to the neural network processor 200. In other words, the data migration engine 204 can realize data interaction between different registers, thereby saving some processes of transmitting data from the neural network processor 200 to the external, reducing interactions between the neural network processor 200 and upper-layer software such as the CPU, and improving data processing efficiency of the neural network processor 200. Meanwhile, the workload of the external CPU can also be reduced.

The data migration engine 204 is connected between a general register 290 and the scalar processing unit 232 of the second processing module 230. Details for the scalar processing unit 232 can be referred to the above description, and are not repeated here again. The scalar processing unit 232 includes a plurality of scalar registers 2322, which are referred to as a scalar register file for short. The scalar processing unit 232 is connected to the data migration engine 204 through the scalar registers 2322. The general register 290 has a plurality of registers, which are referred to as a register file for short. The general register 290 is connected to the data migration engine 204 through the register file therein. It should be noted that the plurality of registers of the general register 290 can all be connected to the data migration engine 204. It should be noted that not all but just some of the plurality of registers of the general register 290 are connected to the data migration engine 204.

Figure 21:
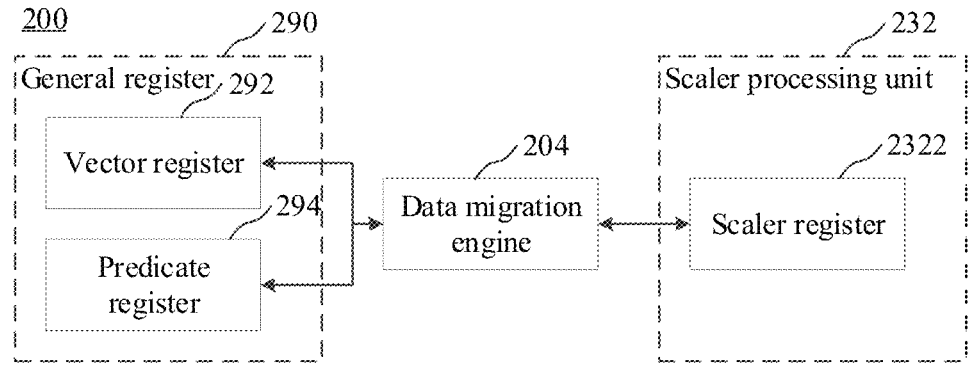
FIG. 21 is a schematic diagram showing a seventeenth structure of a neural network processor according to an embodiment of the disclosure.

FIG. 21 illustrates a seventeenth structure of a neural network processor according to an embodiment of the application. A general register 290 included in a neural network processor 200 may include a plurality of vector registers 292, which are referred to as a vector register file for short. The plurality of vector registers 292 of the embodiment may be all connected to a data migration engine 204. Or, just a part of the plurality of vector registers 292 is connected to the data migration engine 204. The part of the plurality of vector registers 292, can be understood as at least one of the vector registers 292 but not all vector registers 292.

The general register 290 included in the neural network processor 200 may include a plurality of prediction registers 294, which are referred to as a prediction register file or a predicate register file. In the embodiment, the plurality of prediction registers 294 all may be connected to the data migration engine 204, or just some but not all of the plurality of prediction registers 294 are connected to the data migration engine 204.

It should be noted that when the general register 290 includes multiple types of registers, the general register 290 can be connected to the data migration engine 204 through all types of registers or some types of registers. For example, when the general register 290 of the neural network processor 200 includes the plurality of vector registers 292 and the plurality of prediction registers 294, the general register 290 is connected to the data migration engine 204 just through the plurality of vector registers 292.

It should be noted that FIG. 20 and FIG. 21 only show some components of the neural network processor 200, and the other components of the neural network processor 200 can be referred to FIGS. 1-19. In order to describe a relationship between the data migration engine 204 and other components and specific processes of realizing data migration for the data migration engine 204, details are described below with reference to FIG. 22.

Figure 22:
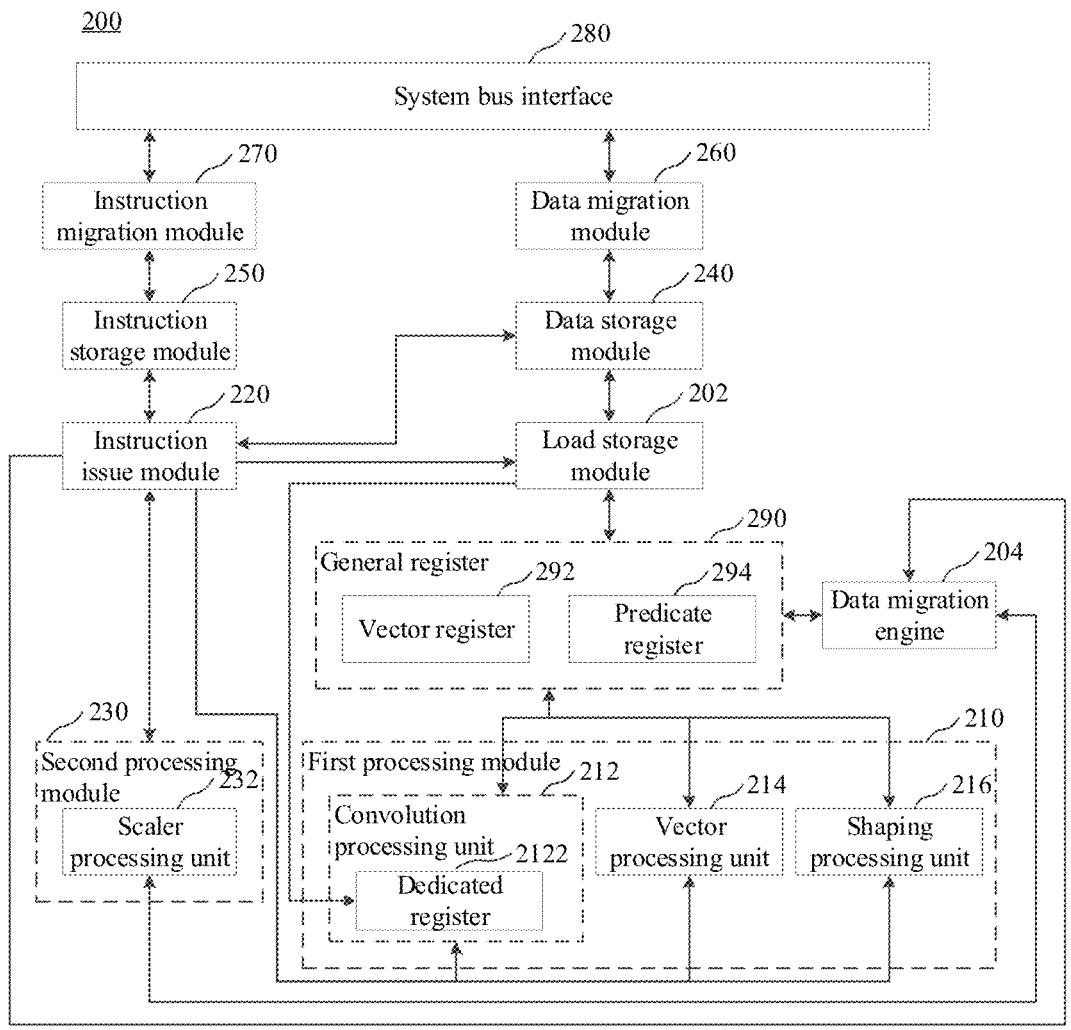
FIG. 22 is a schematic diagram showing an eighteenth structure of a neural network processor according to an embodiment of the disclosure.

FIG. 22 illustrates an eighteenth structure of a neural network processor according to an embodiment of the application. In the embodiment, when some data of a neural network processor 200, such as data required to be processed by a convolution processing unit 212, a vector processing unit 214, or a shaping processing unit 216 included in a first processing module 210, needs to perform scalar calculations, the data can be stored in a general register 290, a data migration engine 204 can move the data to a scalar processing unit 232, and the scalar processing unit 232 performs scalar calculations on the data. When the scalar processing unit 232 completes the calculations on the data and obtains a calculation result, the data migration engine 204 can move the calculation result to the general register 290, and a corresponding processing unit included in the first processing module 210 can obtain the calculation result from the general register 290. As such, in the embodiment, the data migration is occurred inside the neural network processor 200. Compared with that the neural network processor 200 transmits data to the external, the data is processed by external upper-layer software such as the CPU, and then the processed data is returned to the neural network processor 200, this embodiment can reduce interactions between the neural network processor 200 and the external, and improves the efficiency of the neural network processor 200 processing data.

Data processed by the convolution processing unit 212, the vector processing unit 214, or the shaping processing unit 216 of the first processing module 210 requires scalar calculations, for example, an intermediate result processed by the convolution processing unit 212, the vector processing unit 214 or the shaping processing unit 216 of the first processing module 210 requires a judgment operation. The judgment operation can be completed by the scalar processing unit 232. In other words, the data stored in the general register 290 is data to be judged. The data to be judged requires the judgment operation. The data migration engine 201 moves the data to be judged to the scalar register 2322 of the scalar processing unit 232 for the judgment operation.

In the embodiment, when some data of the neural network processor 200, such as scalar data of the scalar processing unit 232, needs to be transformed into vector data, the data migration engine 204 can move the scalar data to the general register 290, and a corresponding processing unit of the first processing module 210, such as the vector processing unit 214, may obtain the scalar data from the general register 290 to transform it into the vector data. It should be noted that scalar data needs to be transformed into the vector data, which can also be considered that the scalar data needs to be expanded into the vector data. For example, a 32-bit data is copied and 16 copies of the 32-bit data form a 512-bit vector.

In practical applications, an instruction issue module 220 is connected to the data migration engine 204, the instruction issue module 220 can issue one or more instructions to the data migration engine 204, and the data migration engine 204 can perform one or more data movement operations according to the one or more instructions that it receives. For example, the instruction issue module 220 issues a first instruction to the data migration engine 204, and the data migration engine 204 moves the data of the general register 290 to the scalar register 2322 of the scalar processing unit 232 according to the first instruction. For another example, the instruction issue module 220 issues a second instruction to the data migration engine 204, and the data migration engine 204 moves the data of the scalar register 2322 to the general register 290 according to the second instruction.

It should be noted that the instruction issue module 220 can issue multiple instructions to the first processing module 210, a second processing module 230, a load storage module 202, and the data migration engine 204 in parallel within one clock cycle. For example, the instruction issue module 220 can issue multiple instructions to the convolution processing unit 212, the vector processing unit 214, the scalar processing unit 232, the load storage module 202, and the data migration engine 204 in parallel within one clock cycle.

The neural network processor 200 can perform convolutional neural network operations, cyclic neural network operations, and the like. The following takes convolutional neural network operations as an example. The neural network processor 200 obtains data to-be-processed (e.g., image data) from the external, and the convolution processing unit 212 in the neural network processor 200 may perform convolution processing on the data to-be-processed. The input of a convolutional layer in a convolutional neural network includes input data (e.g., the data to-be-processed which is obtained for the external) and weight data. Main calculation processes of the convolutional layer are performing convolution operations on the input data and weight data to obtain output data, wherein a main body of performing the convolution operations is the convolution processing unit. It can also be understood as that, the convolution processing unit of the neural network processor performs the convolution operations on the input data and the weight data to obtain the output data. It should be noted that the weight data can be understood as one or more convolution kernels in some cases. The convolution operations are described in detail below.

The size of the input data is H×W×C1, and the size of the weight data is K×R×S×C2, where H is the height of the input data, W is the width of the input data, C1 is the depth of the input data, K is the output number of the weight data, i.e., K is the number of the convolution kernels, R is the height of the weight data, i.e., R is the height of the convolution kernel, S is the width of the weight data, i.e., S is the width of the convolution kernel, and C2 is the depth of the weight data, i.e., C2 is the depth of the convolution kernel. C2 is equal to C1, because C2 and C1 are corresponding depth values and are equal. To facilitate understanding, C2 and C1 are both replaced by C below, which can also be understood as C2=C1=C. The input data size can also be represented as N×H×W×C, where N is the number of batches of the input data.

The convolution processing unit first performs a window processing on the input data according to the size of the convolution kernel, and an Multiply Accumulate (MAC) operation is performed on an obtained window and one convolution kernel of the weight data to obtain a piece of data, then the window slides along a W direction and an H direction respectively, and MAC operations are performed on the window to obtain H'×W' pieces of data, and finally the K convolution kernels are traversed to obtain K×H'×W' pieces of data.

Figure 23:
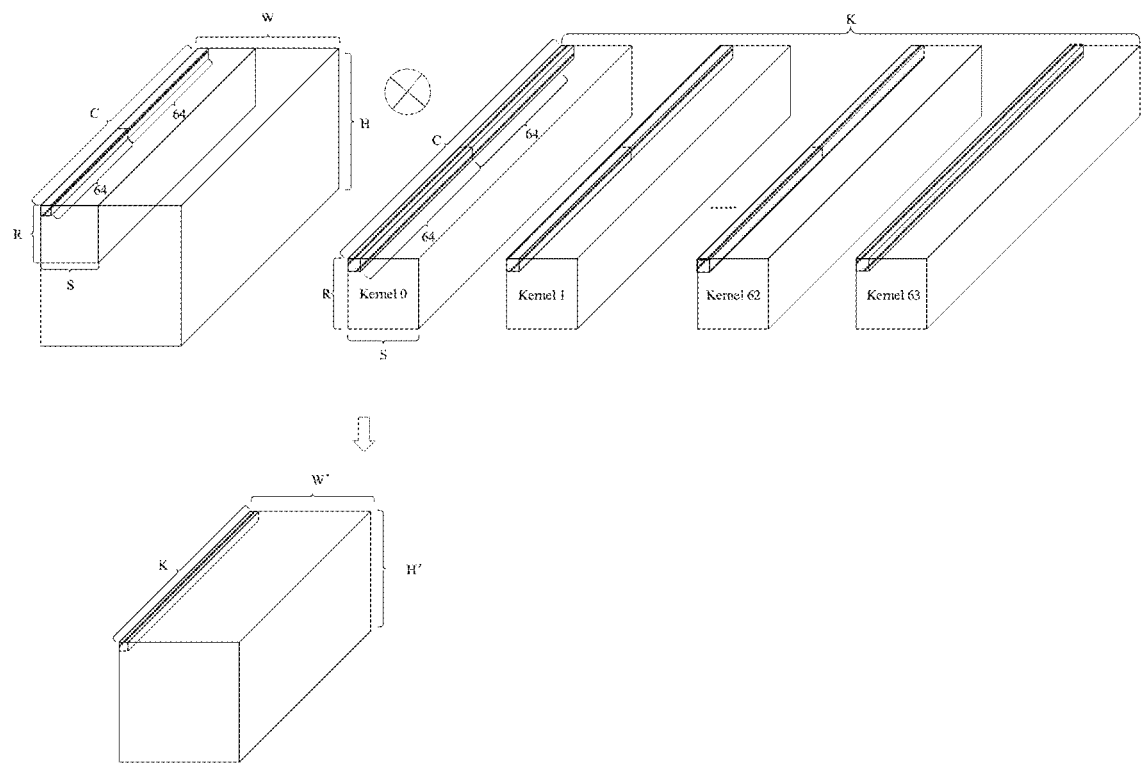
FIG. 23 is a schematic diagram showing a convolution operation of a convolution processing unit in a neural network processor according to an embodiment of the disclosure.

Of course, the convolution processing unit may also adopt other convolution operation manners. Another convolution operation manner is described in detail below. Please refer to FIG. 23, which is a schematic diagram showing convolution operations of a convolution processing unit in a neural network processor according to an embodiment of the application. The input data size is still represented as H×W×C, and the weight data (one or more convolution kernels) is still represented as K×R×S×C. Of course, the input data size can also be represented as N×H×W×C, where N is the number of batches of the input data.

The convolution processing unit first performs a window processing on the input data according to the size of the convolution kernel, MAC operations are performed on a first window obtained after the window processing and all convolution kernels of the weight data to obtain K pieces of data, then the first window slides respectively in the W direction and the H direction and MAC operations are performed to obtain H'×W'×K pieces of data. The specific operation steps are as follows (that is, specific steps of the convolution processing unit performing convolution operations are as follows).

1. A window processing is performed, according to the size of the convolution kernel (R×S), on the input data from a start point (W=0, H=0), so as to obtain the first window area (R×S×C).

2. MAC operations are performed on the first window and each K convolution kernel, so as to obtain K pieces of data.

3. The first window slides a first sliding length along the W direction, to obtain a new first window, wherein the size of the first window remains unchanged, and the first sliding length can be set as required.

4. The above steps 2 and 3 are repeated in sequence until reaching the boundary in the W direction, thus obtaining W'×K pieces of data, where W'=(W−S)/the first sliding length+1. For example, if W=7, S=3, and the first sliding length=2, then W'=3. For another example, if W=7, S=3, and the first sliding length=1, then W'=5.

5. Back to the start point in the W direction, the first window slides a second sliding length along the H direction, to obtain a new first window, wherein the size of the first window remains unchanged, and the second sliding length can be set as required. For example, after the first window sliding the second sliding length in the H direction (assuming the second sliding step length in the H direction is 1), the coordinates are (W=0, H=1).

6. The above steps 2-5 are repeated until reaching the boundary in the H direction, thus obtaining H'×W'×K pieces of data. It should be noted that every time the window slides in the W direction until reaching the boundary of the W direction, but after the last time the window slides in the H direction until reaching the boundary, the window further slides in the W direction until reaching the boundary of the W direction (that is, the above steps 2-4 are repeated).

The convolution operation unit includes a MAC Array for convolution operation. The size of the MAC array (L×M) is fixed, where L is the length of the MAC operation, and M is the number of units performing MAC operations in parallel. It can also be understood as M MAC operations of length L can be performed per cycle. Steps of assigning the MAC operations (i.e., the above step 2) in the above convolution operation processes to the convolution operation unit for parallel operations are as follows (which can also be understood that specific steps of the convolution processing unit performing MAC operations using the MAC array are as follows).

1. At the HW plane, a window processing is performed, according to the size of the convolution kernel (R×S), on the input data from a start point (W=0, H=0), so as to obtain the first window area. In the depth direction, the first window is divided into C/L data segments of a length L. It should be noted that, the first window can be obtained first, and then the first window can be divided into C/L data segments of the length L later; or, the input data can be divided into C/L data segments of the length L first, and then the first window is obtained later, wherein the first window includes the C/L data segments of the length L. It can be understood as the first window may include first depth data of C/L layers along the depth direction.

2. In the depth direction, the convolution kernel is divided into C/L data segments of the length L, and this operation is performed on each K convolution kernel included in the weight data, so K groups of weight data are obtained and each group has C/L weight data segments. It can be understood that each convolution kernel includes C/L pieces of weight data segments of length L along the depth direction. In an alternative way, the K convolution kernels can be divided into K/M convolution kernel groups, each convolution kernel group includes the weight data of M convolution kernels.

3. First depth data of the i-th (i=1,2, ..., C/L) layer of the first window in the input data is fetched to obtain one piece of the first depth data.

4. Second depth data of the i-th (i=1,2, ..., C/L) layer of the f-th (f=1,2, ..., K/M) convolution kernel group are fetched to obtain M pieces of the second depth data.

5. MAC operations are performed, using the MAC array, on the one piece of the first depth data and M pieces of the second depth data (weighted data broadcast multiplexing), to obtain M pieces of first operation data. M weight data segments are weight data segments of M convolution kernels.

6. Incrementing i, the steps 3-5 are repeated. M pieces of first operation data are output and accumulated to the previously calculated M pieces of first operation data, so far, M pieces of target operation data are obtained, where i starts from 1 and increases to C/L.

7. Incrementing f, the steps 3-5 are repeated. K pieces of outputs are obtained after completing K/M calculations, where k starts from 1 and increases to K/M.

The height H, the width W, and the depth C of the input data are random, that is, the size of the input data can have many formats. For example, the width W of the input data is uncertain, the width W of the input data is divided by M (i.e., the number of the units performing MAC operations using the MAC array in parallel), the result is not an integer in most cases, so part of the MAC operation units may be wasted during the MAC operation processes. In the embodiment, the number of the convolution kernels K is divided by M (i.e., the number of the units performing MAC operations using the MAC array in parallel), the number of the convolution kernels K is generally a fixed number and is the nth power of 2 (i.e., 2n), or may be one of several limited numbers (e.g., K is one of 32, 64, 128, 256), as such, when configuring the MAC operation units, the number of the MAC operation units M can be set to be the same or an integral multiple of the number of K, for example, M is one of 32, 64, 128, etc. The embodiment can make full use of the MAC operation units, reduce the waste of the MAC operation units, and improve the efficiency of the convolution operation. In the embodiment, the number of the convolution kernels K is corresponding to the number of the MAC operation units M, this is a division in one dimensional direction. If the number of the MAC units M corresponds to the sliding window area, its corresponding dimensions include not only the width W dimension but also the H dimension, and such a correspondence of the two dimensions is not conducive to folding.

In addition, the format of the output target calculation data in this embodiment is represented as H'×W'×K, which is the same as the format of the input data. It can be directly used as the input data of a next calculation layer (e.g., a next convolution layer or a next pooling layer) without deforming it. Moreover, the target calculation data is continuous data in the depth direction, and the continuous data can be stored and read in sequence. When the hardware loading the continuous data, there is no need to calculate the address of the data multiple times, thereby optimizing the calculation efficiency.

It should be noted that in this embodiment, C is greater than L, K is greater than M, when one or two of C/L and K/M are not divisible, it is necessary to round the undivisible result and add 1, specifically, the integer portion of the result is added 1. Exemplarily, L and M in the MAC Array adopt the same value, such as both are 64. The input data is filled in the depth direction according to the length of 64 granularity. It is divided, along the depth direction, into 1×1×64 data blocks. When the depth is less than 64, the depth is filled to 64. The data organization method is N×H×W×(c× C'), where c=64, C' is equal to 1 plus a rounded result of dividing C by c. The weight data is filled in the depth direction according to the length of 64 granularity. The weight data is divided, along the depth direction, into 1×1×64 data blocks. When the depth is less than 64, it is filled to 64. When the number of the convolution kernels is greater than 64, it is divided into multiple groups according to each group of 64 granularity. After adjusting, the data organization method is R×S×(c×C')×(k×K'), where c=64, C' is equal to 1 plus a rounded result of dividing C by c, k=64, K' is equal to 1 plus a rounded result of dividing K by k.

In the convolution operation processing of this embodiment, the convolution processing unit is further configured to transmit K target operation data corresponding to one window area to the next layer for operations; or the convolution processing unit is configured to transmit N×K target operation data, corresponding to the N first window areas, to the next layer for operations, where N is less than a total number of the first window areas in the output data.

Because each first window area has been fully calculated, that is, all data in each first window area (including the depth direction) are performed MAC operations with all convolution kernels (including the depth direction), the obtained target calculation data is complete, then one or more target calculation data corresponding to one or more first window areas can be transmitted to the next layer first, there is no need to wait for all input data to be completed before transmitting. When a part of the target calculation data transmitted to the next layer can be used as the smallest unit of another next layer calculation (for example, the part of the target calculation data can be used as the data included in a window area of the input data of the another next layer), the another next layer can start calculation, and it is unnecessary to wait for all the operation results of an upper layer. As such, the efficiency of the convolution operation is improved and the time of the convolution operation is shortened. In addition, because the internal buffer of the NPU where the convolution operation units located is generally small, it cannot store large intermediate results. If the format of the data obtained by the convolution operation is K×H'×W', it is needed to complete all calculation of this layer before calculating a next layer, and the output data is large and needs to be cached in an external memory (i.e., a memory outside the neural network processor). However, in the embodiment, the format of the results obtained by the convolution operation is H'×W'×K, after calculating part of the results on the H'×W' plane, a next layer can be directly calculated. The small internal buffer of the NPU only needs to store 1×W'×K or N1×W'×K or N1×N2×K, where N1 can be much smaller than H', and N2 can be much smaller than W'. So, there is no need to cache the output result to external memory, and further read the result from the external memory for next layer operations. This can reduce the bandwidth pressure and improve the efficiency of operation. In addition, in Fusion Layer scenario, it is very convenient to perform pipeline operations.

When the target calculation data to be transmitted to the next layer has duplicate data with the target calculation data transmitted last time, the duplicate data is removed to obtain the target data, and the target data is transmitted to the next layer, thereby optimizing the storage and transmission of data. Of course, in an alternative way, the target calculation data can be completely transmitted every time, and the repeated data may be covered.

The length L of the MAC array performing the MAC operations can be equal to the number of the units M performing the MAC operation units in parallel. Because when the L and M of the MAC array are equal, values of the data in two dimensions obtained by the MAC operations are equal, the calculated results can be adjusted easily. Of course, in some other embodiments, L and M of the MAC array may be different to facilitate the setting of the MAC array.

The convolution processing unit is configured to: perform a window operation on the input data according to the convolution kernel to obtain the first window, which includes the first depth data of the first number of layers in the depth direction; obtain multiple convolution kernels, wherein the convolution kernels include the second depth data of the first number of layers along the depth direction; and perform MAC operations on the first depth data of one layer and the second depth data of the same layer of the convolution kernels to obtain the first operation data.

The convolution processing unit may also perform operations on multiple layers, and is further configured to accumulate multiple first operation data corresponding to the first depth data of the multiple layers to obtain target operation data. That is, based on the single-layer operation in the above embodiments, MAC operations are performed on the first depth data of multiple layers and the second depth data of multiple convolution kernels, to obtain the target operation data after accumulating multiple first operation data.

The convolution processing unit can store its operation result in the data storage module, and can also transmit the operation result to the vector processing unit or the shaping processing unit for further calculation operations.

The neural network processor 200 provided in the embodiments of the application can be integrated into one chip.

Figure 24:
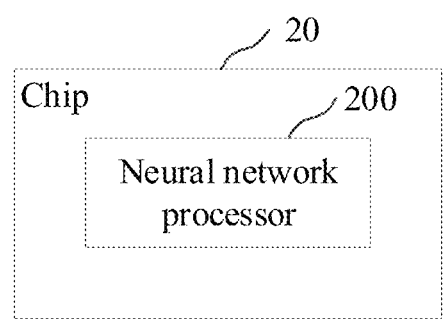
FIG. 24 is a structural diagram of a chip according to an embodiment of the disclosure.

FIG. 24 illustrates a schematic structural diagram of a chip according to an embodiment of the application. A chip 20 includes a neural network processor 200, and details of the neural network processor 200 can refer to the above description and are not repeated here again. The chip 20 can be applied to an electronic device.

It should be noted that the neural network processor 200 of the embodiment can also be integrated with other processors, memories, and the like into the chip 20.

In order to explain the overall operation processes of the neural network processor 200 in the embodiment of the application, the following description is made in combination with other processors and memories.

Figure 25:
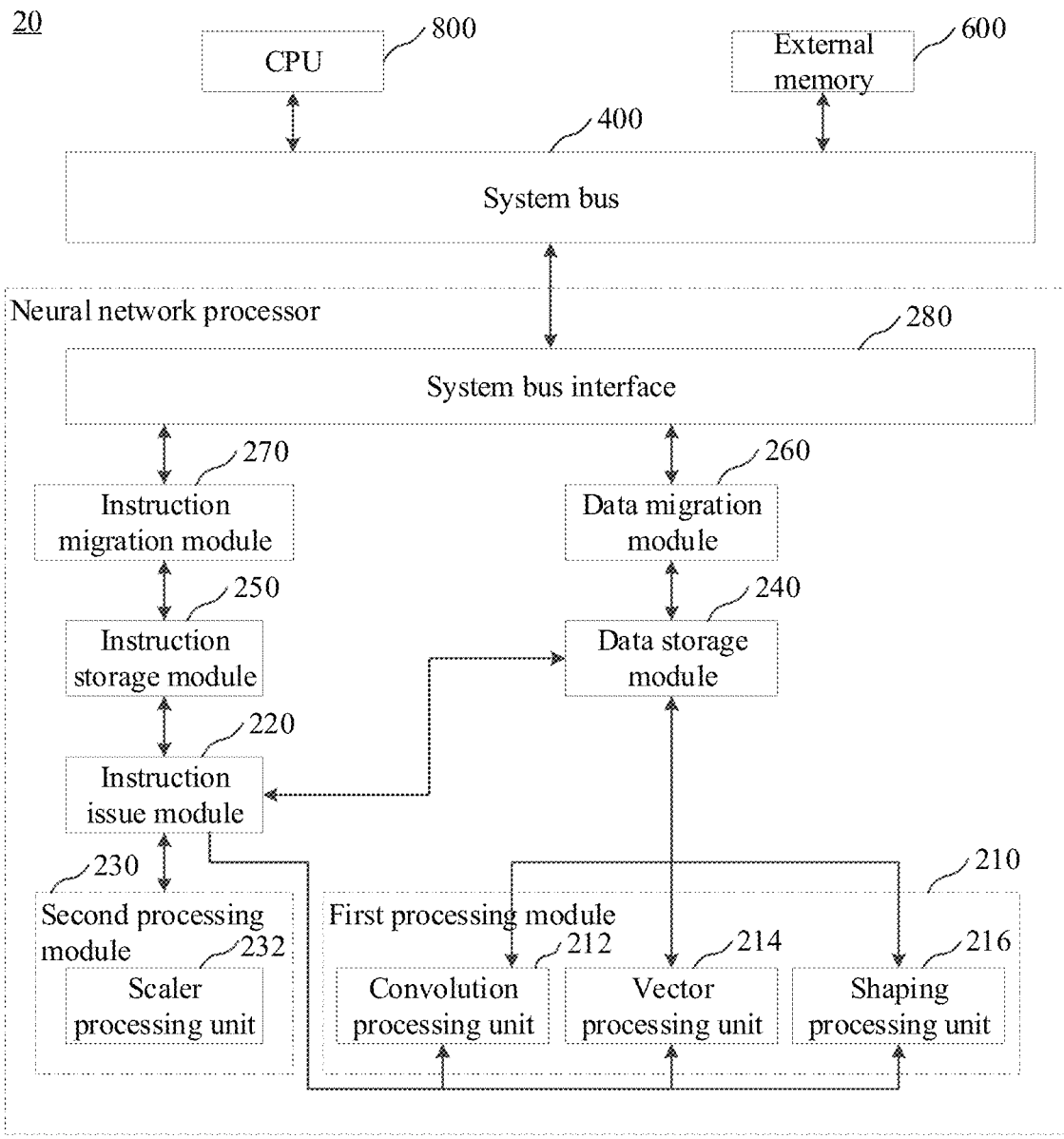
FIG. 25 is a structural diagram of an electronic device according to an embodiment of the disclosure.

Please refer to FIG. 25, which is a schematic structural diagram of an electronic device according to an embodiment of the application. An electronic device 20 includes a neural network processor 200, a system bus 400, an external memory 600, and a central processing unit 800. The neural network processor 200, the external memory 600, and the central processing unit 800 each are connected to the system bus 400, so that the neural network processor 200 and the external memory 600 can realize data transmission.

The system bus 400 is connected to the neural network processor 200 through a system bus interface 280. The system bus 400 may be connected to the central processing unit 800 and the external memory 600 through other system bus interfaces.

The neural network processor 200 is controlled by the central processing unit 800 to obtain data to-be-processed from the external memory 600, process the data to-be-processed to obtain a processing result, and feed back the processing result to the external memory 600.

When it is needed to use the neural network processor 200 for data processing, an upper-layer driving software of the electronic device 20, such as the central processing unit 800, writes configurations of a current program to be executed into a corresponding register, for example, the configurations may include a working mode, an initial program counter (PC) value, configuration parameters, etc. Then, the data migration module 260 reads the data to-be-processed, such as image data and weight data, from the external memory 600 through the system bus interface 280, and writes the data to a data storage module 240. An instruction issue module 220 starts to fetch one or more instructions according to the initial PC. After the one or more instructions are fetched, the instruction issue module 220 issues the instructions to corresponding processing units according to the types of the instructions. Each processing unit performs different operations according to specific instructions, and then writes the results to the data storage module 240.

The register is a configuration status register of the neural network processor 200, or is called a control status register. It can set the working mode of the neural network processor 200, such as a bit width of input data, a position of the initial PC of the program, and so on.

It should be noted that the neural network processor shown in FIG. 25 can also be replaced with other neural network processors shown in other figures.

The following describes the application from the perspective of data processing method steps and data loading method steps through a neural network processor.

Figure 26:
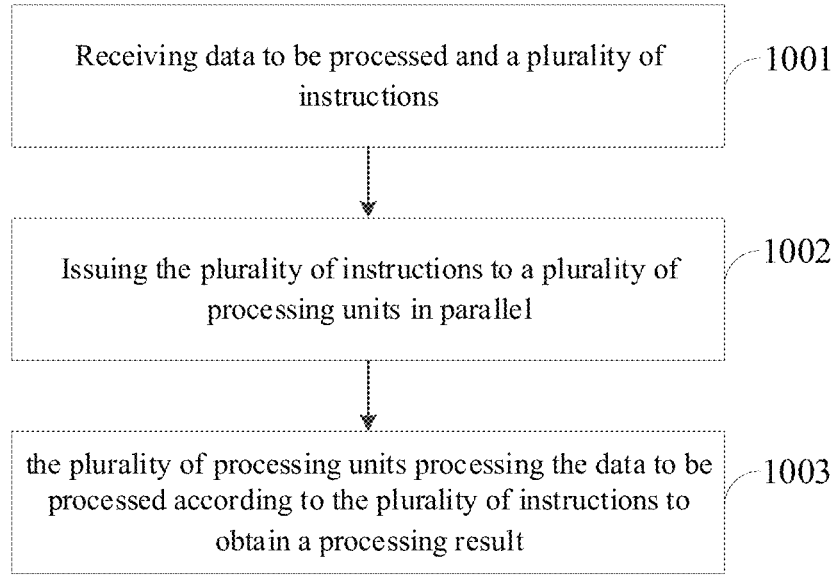
FIG. 26 is a schematic flowchart of a data processing method according to an embodiment of the disclosure.

FIG. 26 illustrates a flowchart of a data processing method according to an embodiment of the application. The data processing method is based on the above-mentioned neural network processor to process data. The data processing method includes the follows.

1001, data to-be-processed and a plurality of instructions are received. The data to-be-processed may be image data and weight data that need to be processed by the neural network processor. A data migration module 260 can be used to read the data to-be-processed from an external memory 600 through a system bus interface 280. Of course, a DMA 260b can also be used to move the data to-be-processed from the external memory through a system bus interface 266b. After receiving the data to-be-processed, the data to-be-processed can be loaded into a data storage module 240.

The plurality of instructions may be calculation instructions or control instructions. An instruction migration module 270 can be used to read the required instructions from the external through the system bus interface 280. Of course, the DMA 260b can also be used to migrate the required instructions from the external through the system bus interface 266b. It can also write instructions directly to the neural network process 200 from the external. After receiving the plurality of instructions, the instructions can be loaded into an instruction storage module 250.

1002, the plurality of instructions are issued to a plurality of processing units in parallel. An instruction issue module 220 of the neural network processor 200 can issue the instructions to their respective processing units within one clock cycle according to the received instructions, so that each processing unit processes the data to-be-processed according to their respective instructions. The instruction issue module 220 can issue the plurality of instructions to at least two processing units included in a first processing module 210 within one clock cycle. The instruction issue module 220 may issue the plurality of instructions to a scalar processing unit 232 and at least one processing unit of the first processing module 210 within one clock cycle.

It should be noted that, in order to ensure that the instructions issued by the instruction issue module 220 are all useful, in other words, in order to ensure that each processing unit processes the data according to their respective instructions after the instruction issue module 220 issuing the instructions, the instruction issue module 220 sends a judgment signal to the data storage module 240 before issuing the instructions, the instruction distribution module 220 first sends a judgment signal to the data storage module 240, when a return signal is returned from the data storage module 240, the instruction issue module 240 determines whether the data storage module 240 stores the data to-be-processed according to the return signal. If the instruction issue module 220 determines that the data storage module 240 does not store the data to-be-processed, the instruction issue module 240 will not issue instructions to each processing unit. Only when the instruction issue module 220 determines that the data storage module 240 has the data to-be-processed stored therein, the instruction issue module 240 will issue the instructions to the processing units.

1003, the plurality of processing units process the data to-be-processed according to the plurality of instructions to obtain one or more processing results. Each processing unit 230 obtains a corresponding processing result after processing the data to-be-processed. In the embodiment of the application, the plurality of processing units 230 may also write their processing results to the data storage module 240. Furthermore, the data migration module 260 and the system bus interface 280 can transmit the processing results to an external memory 600.

After completing the data processing, if the instruction issue module 220 of the neural network processor receives a terminate identification instruction, it considers that the program has been executed over and issues an interrupt to an upper-layer software to terminate the work of the neural network processor 200. If it is not terminated, it returns to 1002 and continues to fetch instructions to execute instruction issue until the program has been executed over.

Figure 27:
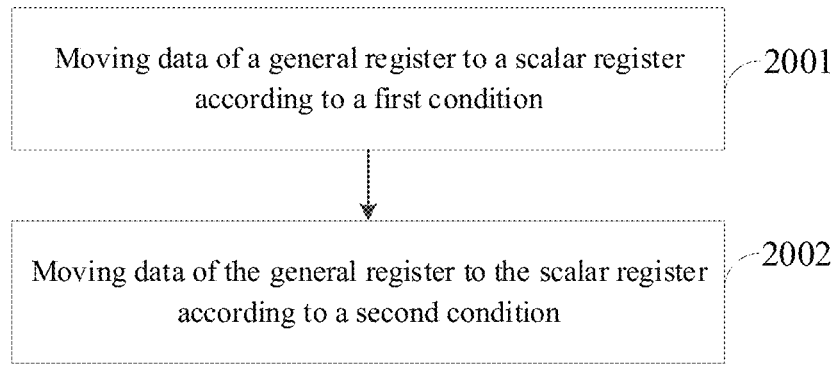
FIG. 27 is a schematic flowchart of a data processing method according to another embodiment of the disclosure.

FIG. 27 illustrates a flowchart of a data processing method according to an embodiment of the application. The data processing method is based on the above-mentioned neural network processor to process data. The data processing method includes the follows.

2001, data of a general register is moved to a scalar register according to a first condition. The first condition can be a first instruction. A data migration engine 204 can move the data of the general register 290 to the scalar register 2322 according to the first instruction, and details can refer to the above content, which will not be repeated here.

2002, data of the general register is moved to the scalar register according to a second condition. The second condition can be a second instruction. The data migration engine 204 can move the data of the scalar register 2322 to the general register 290 according to the second instruction, and details can refer to the above content, which will not be repeated here.

Figure 28:
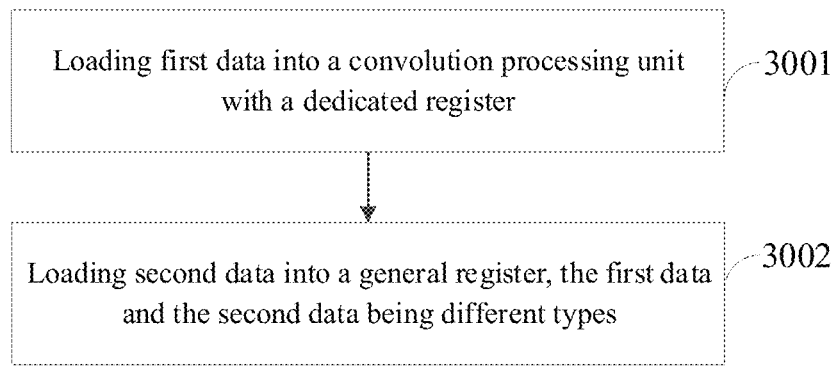
FIG. 28 is a schematic flowchart of a data loading method according to an embodiment of the disclosure.

FIG. 28 illustrates a flowchart of a data loading method according to an embodiment of the application. The data loading method is based on the above neural network processor 200 to load data, and the data loading method includes the following steps.

3001, first data is loaded into a convolution processing unit with a dedicated register. The convolution processing unit 212 with the dedicated register 2122 can refer to the above content and details are not repeated here again.

3002, second data is loaded into a general register, wherein the first data and the second data are different types. The general register 290 can refer to the above content, which will not be repeated here. In the embodiments of the application, an LSU 202 can be used to load or transmit data. Specific data loading or transmitting method can refer to the above description. The first data and the second data also can refer to the above description, which will not be repeated here.

The neural network processor, the chip, and the electronic device provided in the embodiments of the application are described in detail above. Specific examples are used in this article to illustrate the principle and implementation of the application, and the description of the above examples is only used to help understand the application. Meanwhile, for those skilled in the art, according to the spirit of the application, there will be changes in the specific implementation and the scope of application. In summary, the content of this specification should not be construed as a limitation to the application.

What is claimed is:

1. A neural network processor, comprising:
a convolution processing unit;
a vector processing unit;
an instruction issue module, wherein the convolution processing unit and the vector processing unit are both in communication with the instruction issue module, and the instruction issue module is configured to issue a plurality of instructions to the convolution processing unit and the vector processing unit in parallel; and
a data storage module configured to store the data to-be-processed therein, wherein the data storage module is in communication with both of the convolution processing unit and the vector processing unit, and the convolution processing unit and the vector processing unit are configured to process the data to-be-processed to obtain one or more processing results and store the one or more processing results into the data storage module;
wherein the convolution processing unit and the vector processing unit are configured to process the data to-be-processed to obtain one or more processing results and store the one or more processing results into the data storage module, comprises:
the convolution processing unit performs a first processing on the data to-be-processed to obtain an intermediate processing result and directly transmits the intermediate processing result to the vector processing unit, the vector processing unit performs a second processing on the intermediate processing result to obtain the processing result and store the processing result into the data storage module; or
the convolution processing unit performs a first processing on the data to-be-processed to obtain an intermediate processing result and stores the intermediate processing result into the data storage module, the vector processing unit acquires the intermediate processing result from the data storage module, performs a second processing on the intermediate processing result to obtain the processing result, and stores the processing result into the data storage module.

2. The neural network processor according to claim 1, wherein the instruction issue module is configured to issue the plurality of instructions to the convolution processing unit and the vector processing unit in parallel within one clock cycle.

3. The neural network processor according to claim 1, wherein the instruction issue module is configured to issue the plurality of instructions to the convolution processing unit and the vector processing unit in parallel, according to types of the plurality of instructions.

4. The neural network processor according to claim 1, further comprising a scalar processing unit in communication with the instruction issue module, wherein the instruction issue module is further configured to issue the plurality of instructions to the convolution processing unit and the scalar processing unit in parallel within one clock cycle.

5. The neural network processor according to claim 1, further comprising a scalar processing unit in communication with the instruction issue module, wherein the instruction issue module is further configured to issue the plurality of instructions to the convolution processing unit and the scalar processing unit in parallel, according to types of the plurality of instructions.

6. The neural network processor according to claim 1, further comprising a scalar processing unit in communication with the instruction issue module, wherein the instruction issue module is further configured to issue the plurality of instructions to the convolution processing unit, the vector processing unit and the scalar processing unit in parallel.

7. The neural network processor according to claim 6, further comprising a shaping processing unit in communication with the instruction issue module, wherein the instruction issue module is configured to issue the plurality of instructions to the convolution processing unit, the vector processing unit, the scalar processing unit and the shaping processing unit in parallel.

8. The neural network processor according to claim 1, wherein the plurality of instructions issued by the instruction issue module comprises a fine-grained instruction, the instruction issue module is configured to issue the fine-grained instruction to the convolution processing unit, and the convolution processing unit is configured to perform, according to the fine-grained instruction, a dot product operation on data received on the convolution processing unit.

9. The neural network processor according to claim 1, wherein the data storage module is further in communication with the instruction issue module; the instruction issue module is further configured to:
   issue the plurality of instructions to the convolution processing unit and the vector processing unit in parallel, in response to that the data storage module has data to-be-processed stored therein;
   do not issue any instruction to the convolution processing unit and the vector processing unit, in response to that the data storage module does not store the data to-be-processed therein.

10. The neural network processor according to claim 1, further comprising a scalar processing unit in communication with the instruction issue module, wherein the data storage module is further in communication with both of the scalar processing unit and the instruction issue module; the instruction issue module is further configured to:
   issue the plurality of instructions to the convolution processing unit, the vector processing unit and the scalar processing unit in parallel, in response to that the data storage module has data to-be-processed stored therein;
   do not issue any instruction to the convolution processing unit, the vector processing unit and the scalar processing unit, in response to that the data storage module does not store the data to-be-processed therein.

11. The neural network processor according to claim 1, further comprising an instruction storage module in communication with the instruction issue module, wherein the instruction storage module is configured to store part or all instructions required to be issued by the instruction issue module.

12. The neural network processor according to claim 11, further comprising:
   a system bus interface, configured to be in communication with a system bus;
   a data migration module, connected between the data storage module and the system bus interface, wherein the data migration module is configured to move data; and
   an instruction migration module, connected between the instruction storage module and the system bus interface, wherein the instruction migration module is configured to move instructions.

13. The neural network processor according to claim 11, further comprising:
   a system bus interface, configured to be in communication with a system bus, the system bus interface being in communication with the instruction storage module; and
   a data migration module, connected between the data storage module and the system bus interface, the data migration module being configured to move data.

14. The neural network processor according to claim 11, further comprising:
   a system bus interface, configured to be in communication with a system bus;
   an instruction storage module, configured to store one or more instructions, the instruction storage module being in communication with the instruction issue module; and
   a direct memory access, comprising at least one physical channel, at least one logical channel, and a first arbitration unit, wherein the at least one physical channel and at least one logical channel are in communication with the system bus interface through the first arbitration unit, the at least one physical channel is connected with the instruction storage module, and the at least one logical channel is connected with the data storage module.

15. A chip, comprising:
   a system bus;
   an external memory;
   a central processing unit;
   a neural network processor, connected to both of the external memory and the central processing unit via the system bus, wherein the neural network processor is controlled by the central processing unit to acquire data to-be-processed from the external memory, process the data to-be-processed to form a processing result, and feed back the processing result to the external memory;
   wherein the neural network processor comprises:
      a convolution processing unit;
      a vector processing unit;
      an instruction issue module, being in communication with both of the convolution processing unit and the vector processing unit, the instruction issue module being configured to issue a plurality of instructions to the convolution processing unit and the vector processing unit in parallel; and
      a data storage module configured to store the data to-be-processed therein, wherein the data storage module is in communication with both of the convolution processing unit and the vector processing unit, and the convolution processing unit and the vector processing unit are configured to process the data to-be-processed to obtain one or more processing results and store the one or more processing results into the data storage module;
   wherein the convolution processing unit and the vector processing unit are configured to process the data to-be-processed to obtain one or more processing results and store the one or more processing results into the data storage module, comprises:
      the convolution processing unit performs a first processing on the data to-be-processed to obtain an intermediate processing result and directly transmits the intermediate processing result to the vector processing unit, the vector processing unit performs a second processing on the intermediate processing result to obtain the processing result and store the processing result into the data storage module; or
      the convolution processing unit performs a first processing on the data to-be-processed to obtain an intermediate processing result and stores the intermediate processing result into the data storage module, the vector processing unit acquires the intermediate processing result from the data storage module, performs a second processing on the intermediate processing result to obtain the processing result, and stores the processing result into the data storage module.

16. An electronic device, comprising:
   a system bus;
   an external memory;
   a central processing unit; and
   a neural network processor, connected to both of the external memory and the central processing unit via the system bus, wherein the neural network processor is controlled by the central processing unit to acquire data to-be-processed from the external memory, process the data to-be-processed to form a processing result, and feed back the processing result to the external memory;

wherein the neural network processor comprises:
- a convolution processing unit;
- a vector processing unit;
- an instruction issue module, being in communication with both of the convolution processing unit and the vector processing unit, the instruction issue module being configured to issue a plurality of instructions to the convolution processing unit and the vector processing unit in parallel; and
- a data storage module configured to store the data to-be-processed therein, wherein the data storage module is in communication with both of the convolution processing unit and the vector processing unit, and the convolution processing unit and the vector processing unit are configured to process the data to-be-processed to obtain one or more processing results and store the one or more processing results into the data storage module;

wherein the convolution processing unit and the vector processing unit are configured to process the data to-be-processed to obtain one or more processing results and store the one or more processing results into the data storage module, comprises:

the convolution processing unit performs a first processing on the data to-be-processed to obtain an intermediate processing result and directly transmits the intermediate processing result to the vector processing unit, the vector processing unit performs a second processing on the intermediate processing result to obtain the processing result and store the processing result into the data storage module; or the convolution processing unit performs a first processing on the data to-be-processed to obtain an intermediate processing result and stores the intermediate processing result into the data storage module, the vector processing unit acquires the intermediate processing result from the data storage module, performs a second processing on the intermediate processing result to obtain the processing result, and stores the processing result into the data storage module.

* * * * *